(12) United States Patent
Reynoso et al.

(10) Patent No.: US 8,847,514 B1
(45) Date of Patent: Sep. 30, 2014

(54) PROGRAMMABLE LIGHTING WITH MULTI-DAY VARIATIONS OF WAVELENGTH AND INTENSITY, OPTIMIZED BY CROWDSOURCING USING AN ONLINE SOCIAL COMMUNITY NETWORK

(76) Inventors: Aaron Reynoso, Fremont, CA (US); Gang Zhao, Fremont, CA (US)

( * ) Notice: Subject to any disclaimer, the term of this patent is extended or adjusted under 35 U.S.C. 154(b) by 798 days.

(21) Appl. No.: 13/115,074

(22) Filed: May 24, 2011

(51) Int. Cl.
*H05B 37/02* (2006.01)

(52) U.S. Cl.
USPC .................. 315/307; 315/363; 47/58.1 LS

(58) Field of Classification Search
USPC ............. 315/291, 307, 294, 297, 312, 363; 47/58.1 LS
See application file for complete search history.

(56) References Cited

U.S. PATENT DOCUMENTS

| | | | |
|---|---|---|---|
| 5,012,609 A | 5/1991 | Ignatius et al. | |
| 5,211,469 A | 5/1993 | Matthias et al. | |
| 5,278,432 A | 1/1994 | Ignatius et al. | |
| 6,212,823 B1 | 4/2001 | Oram et al. | |
| 6,459,919 B1 | 10/2002 | Lys et al. | |
| 6,528,954 B1 | 3/2003 | Lys et al. | |
| 6,651,218 B1 | 11/2003 | Adler et al. | |
| 6,725,598 B2 | 4/2004 | Yoneda et al. | |
| 6,921,182 B2 | 7/2005 | Anderson, Jr. et al. | |
| 7,033,060 B2 | 4/2006 | Dubuc | |
| 7,184,846 B2 | 2/2007 | Albright et al. | |
| 7,328,708 B2 | 2/2008 | Malak | |
| 7,567,977 B1 | 7/2009 | White | |
| 7,620,902 B2 | 11/2009 | Manion et al. | |
| 7,764,028 B2 | 7/2010 | Mariyama et al. | |
| 7,878,674 B2 | 2/2011 | Crabb et al. | |
| 7,896,524 B2 | 3/2011 | Yoneda et al. | |
| 7,904,403 B2 | 3/2011 | Birsan et al. | |
| 2003/0005626 A1 | 1/2003 | Yoneda et al. | |
| 2003/0009933 A1 | 1/2003 | Yoneda et al. | |
| 2003/0163356 A1 | 8/2003 | Marks et al. | |
| 2006/0006820 A1 | 1/2006 | Roseman et al. | |
| 2007/0058368 A1 | 3/2007 | Partee et al. | |
| 2008/0288914 A1 | 11/2008 | Schmitter | |
| 2008/0302004 A1 | 12/2008 | Lin | |
| 2009/0112712 A1 | 4/2009 | Milone | |
| 2009/0157497 A1 | 6/2009 | Fusz | |
| 2009/0171510 A1 | 7/2009 | Hu | |
| 2009/0171935 A1 | 7/2009 | Birsan et al. | |
| 2009/0288340 A1 | 11/2009 | Hess | |
| 2009/0309515 A1 | 12/2009 | Crabb et al. | |
| 2009/0323321 A1 | 12/2009 | Paolini | |
| 2010/0020536 A1 | 1/2010 | Bafetti et al. | |
| 2010/0076620 A1 | 3/2010 | Loebl et al. | |
| 2010/0115830 A1 | 5/2010 | Dube | |
| 2010/0259190 A1 | 10/2010 | Aikala | |
| 2010/0277078 A1 | 11/2010 | Morton | |
| 2011/0062873 A1 | 3/2011 | Gall et al. | |

*Primary Examiner* — Douglas W Owens
*Assistant Examiner* — Jonathan Cooper
(74) *Attorney, Agent, or Firm* — Stuart T. Auvinen; gPatent LLC

(57) ABSTRACT

A programmable luminaire has arrays of LED's producing different wavelengths of light. A light map specifies how wavelengths of light reaching a plant or other organism are changed throughout a virtual day and over different growth phases of a plant's life. A host interface has a GUI light-map editor allowing a user to edit individual wavelengths in a light map that can be uploaded and shared with other users on a crowdsourcing web site. A large on-line community optimizes the light maps for a specific species of plants or animals. The wisdom of crowds converges until the best wavelengths, intensity and duration are arrived at through ranking, resulting in maximum desired output. Light maps are voted on by users and ranked based on votes, links to other light maps, and yield results. The LED's may be dimmed at intervals during the day for shading and sun fleck.

20 Claims, 21 Drawing Sheets

| STEP | Time/Date Stamp | λ1 | λ2 | λ3 | λ4 | λ5 | λ6 | λ7 | λ8 | λ9 | λ10 | λ11 |
|---|---|---|---|---|---|---|---|---|---|---|---|---|
| 1 | 20110506120O | 10% | 0% | 40% | 28% | 10% | 67% | 20% | 80% | 100% | 0% | 0% |
| 2 | 20110506120S | 10% | 5% | 40% | 45% | 15% | 34% | 36% | 87% | 67% | 0% | 0% |
| 3 | 20110506121S | 10% | 20% | 40% | 45% | 20% | 26% | 45% | 100% | 67% | 0% | 0% |
| 4 | 20110506122O | 10% | 50% | 30% | 67% | 30% | 16% | 57% | 100% | 85% | 0% | 100% |
| 5 | 20110506124O | 10% | 70% | 16% | 57% | 100% | 85% | 0% | 100% | 85% | 0% | 100% |
| 6 | 20110506130O | 10% | 40% | 16% | 57% | 100% | 85% | 0% | 100% | 85% | 0% | 100% |
| ... | | | | | | | | | | | | |
| 47 | 20110506222S | 10% | 80% | 25% | 67% | 40% | 0% | 68% | 97% | 34% | 0% | 100% |
| 48 | 20110506224O | 10% | 100% | 20% | 80% | 80% | 0% | 90% | 87% | 25% | 0% | 0% |
| 49 | 20110506225O | 10% | 60% | 10% | 57% | 90% | 57% | 90% | 80% | 67% | 0% | 0% |
| 50 | 20110506230O | 10% | 20% | 0% | 28% | 10% | 0% | 80% | 80% | 100% | 0% | 0% |

WAVELENGTH

FIG. 3A

PROGRAMMABLE LIGHTING WITH MULTI-DAY VARIATIONS OF WAVELENGTH AND INTENSITY, OPTIMIZED BY CROWDSOURCING USING AN ONLINE SOCIAL COMMUNITY NETWORK

FIELD OF THE INVENTION

This invention relates to programmable lighting, and more particularly to optimizing programmable lighting using crowdsourcing.

BACKGROUND OF THE INVENTION

Light is absorbed by plants and forms the basis of most food chains on Earth. Photons from the sun are absorbed by plants to convert carbon dioxide and water into carbohydrates. Photosynthesis is a complex multi-step chemical reaction that is powered by photons of specific wavelengths or energies. While sunlight has a broad spectrum that appears white, plants appear green since they reflect green and absorb light of other colors. Three principal characteristics of light affect plant growth: quantity (intensity or photon quantity), quality (light wavelength or color), and duration (time).

Plants and animals are sensitive to light for a variety of reasons that are not fully understood. While photosynthesis strongly absorbs red light, there is some absorption of other colors. Leafy plants also absorb blue light, which promotes photomorphogenesis, phototropism, and flowering.

FIG. 1 is a graph of absorption of light by a plant as a function of wavelength. Short wavelength light, such as blue in the 400-500 nm range, provide photons that are absorbed by chlorophyll and promote plant growth. While most green light is reflected by plants, some green or yellow light is still absorbed. The absorption curve has a low trough in the 500-600 nm wavelength region.

The largest absorption by the plant occurs in the 600-700 nm red region. photosynthesis strongly absorbs red light. Red light promotes seed germination, pigment formation, flowering, and may induce dormancy.

Another peak in absorption occurs in the far-red region of 700-750 nm. Far-red wavelengths influence seed germination, flowering, and stem elongation (plant height).

The exact shape of the curve of plant absorption shown in FIG. 1 varies with the species of plant, and perhaps even with the growth stage that the plant is in.

Altering the wavelengths of light applied to a plant may improve targeted results. For example, increasing the intensity of red wavelengths may be better for a fruit tree or a flower, while green lettuce may benefit from increased blue light. Applying increased far-red light to plants in a nursery may increase the height of these plants, improving their salability and profit.

FIG. 2 shows spectra of prior-art lights compared with a plant sensitivity curve. A Plant Sensitivity Curve (PSC), such as the one shown in FIG. 1, is overlaid on the graphs as a dashed line. This PSC has a strong absorption in the longer red wavelengths and in the shorter blue wavelengths than in the middle yellow-green wavelengths. Every plant or organism has a different PSC.

Traditional plant lighting systems use High-Pressure Sodium (HPS) or Metal Halide (MH) bulbs. These light sources produce wavelengths of light that depend on chemicals such as sodium that emit light at specific wavelengths when excited. A HPS source emits a red-orange spectrum with a red peak energy that is near to the red peak of the plant absorption as shown by the dashed PSC (but little in the Far Red region). HPS lights are often used for fruiting and flowering plants that need red light.

Metal Halide (MH) lights emit a blue-white light that drops off in the red region where the PSC has a broad peak. MH lights may be better suited for vegetative growth and seedlings but are less effective for fruiting and flowering.

Both MH and HPS lights do not exactly match the plant's absorption. Both have peaks in the green-yellow region between 520-610 nm. About 20 to 30% of the light is emitted outside the Photosenthetically Active Region (PAR). Thus the spectral efficiency is lacking. Energy that is not absorbed by the plant is wasted.

Both MH and HPS light sources produce a significant amount of waste heat. This heat can burn or otherwise damage plants, so the lights must be kept a safe distance from the plants. However, as the distance is increased, the intensity of light reaching the plant decreases with the square of the distance. The greenhouse may require cooling equipment to remove the waste heat from these lights, increasing energy consumption and cost. These lights cannot be switched on and off frequently to mimic secondary effects such as sun fleck (brief increases in solar irradiance), such as occur naturally when plants on a forest floor are shaded by the movement of leaves on trees above blowing in the wind. When HPS or MH lights are switched on and off frequently, their ballasts may burn out and fail.

More recently, Light-Emitting Diode (LED) lamps have become available. LEDs are more efficient since LEDs have a higher efficacy, (optical watts)/(input energy watts). LEDs can reduce power consumption compared to HPS and MH lamps. Radiated heat is significantly reduced, so the LED lamps can be placed closer to the plants, increasing the light energy that reaches the plant.

Different types and species of plants may have different lighting requirements. These light requirements may vary with the different stages of growth. While much research has been done to study the effects of different wavelengths of light upon plants, the results vary widely and are hard to duplicate, especially since they are influenced by a number of variables. Commercial interests such as commercial growers could improve yield efficiency if they could find light research results for their particular plants or could better understand the relationship between lighting and plant yields.

What is desired is a programmable grow light using LED's of different wavelengths. A programmable grow light that can adjust the wavelengths of light reaching a plant, and can vary these wavelengths over different growth phases of a plant's life is desirable. A host interface that can record these wavelengths in a light map that can be uploaded and shared with others on a web site is desirable. A voting, ranking, or evaluation mechanism of these light maps is desirable to allow a large on-line community to discuss, modify, and recommend different wavelength settings resulting in optimized light maps for different species of plants.

BRIEF DESCRIPTION OF THE DRAWINGS

FIG. 3A shows a light map.

DETAILED DESCRIPTION

The present invention relates to an improvement in lighting systems. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIG. 3A shows a light map. The light map specifies the energy for each wavelength as a function of time. A light map may be organized as a look up table that is organized by rows. Each row shows a different time/date and has several wavelength intensities that are set at that time/date. If an intensity is 100%, the corresponding LED is turned fully on, if the intensity is 0% the corresponding LED is turned off. The time/date stamp has the year, month, day, hour, and minute concatenated. For example, the first row's time/date stamp of 201105061200 indicates the year 2011, May 5, 12 hours 0 minutes (noon).

Figure 3B:
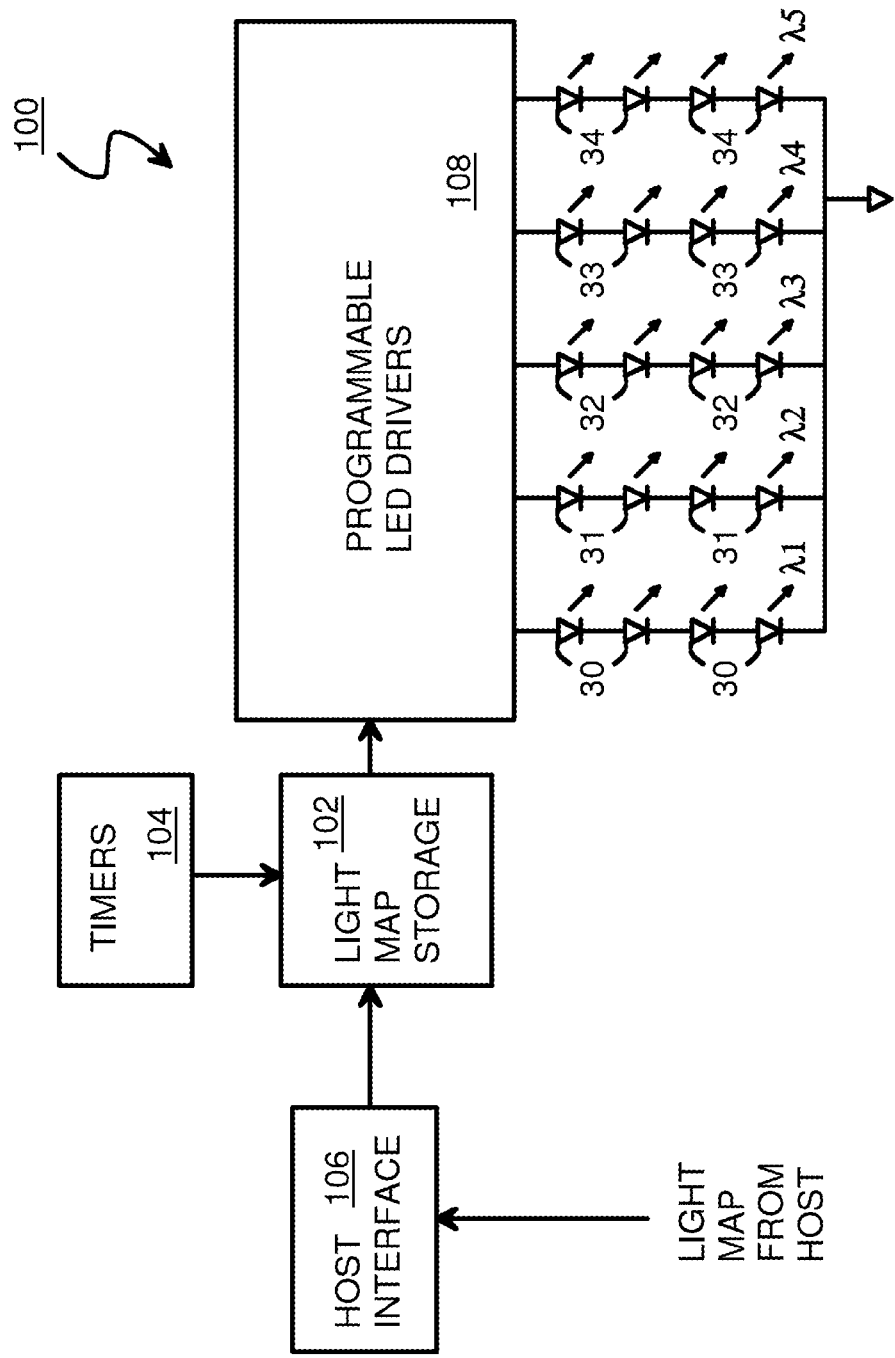
FIG. 3B is a block diagram of a programmable lamp using a light map.

FIG. 3B is a block diagram of a programmable lamp using a light map. Programmable luminaire 100 has arrays of Light-Emitting Diodes (LED's) that emit at different wavelengths. LEDs 30 emit at wavelength λ1, while LED's 31 emit at wavelength λ2. LED's 32 emit at λ3, LED's 33 emit at λ4, and LED's 34 emit at λ5.

For example, λ1 could be 440 nm (blue), λ2 could be 480 nm (blue), λ3 could be 615 nm (red), λ4 could be 660 nm (red), and λ5 could be 740 nm (far-red). These are wavelengths that are more strongly absorbed by a plant.

Each of the LED arrays (LED's 30-34) are separately driven by programmable LED drivers 108. The current driven through an LED array can be adjusted by programmable LED drivers 108 so that more light (photon energy) is produced at certain desirable wavelengths and less at other wavelengths. As more current is drawn through an LED, the intensity and light output of that LED is increased. The wavelength of light output from the LED is relatively constant as the current is varied, since the wavelength of photons emitted primarily depends on the semiconductor materials used in the junction of the LED.

Light map storage 102 stores light maps that control programmable LED drivers 108 to output various currents to drive LED's 30-34 to different intensities, producing a desired mix of wavelengths of light.

When timers 104 advanced to match a date/time in a next row of light map storage 102, the intensities in that row are sent to programmable LED drivers 108, which adjust the light output of LED's 30-34. Timers 104 may include a Real Time Clock (RTC).

For example, a new row of the light map (FIG. 3A) may be sent to programmable LED drivers 108 every 15 minutes during the day. Wavelengths can be adjusted every 15 minutes in this example. A light map may also indicate a length of daylight and a length of darkness in a 24-hour period.

A repeat count could also be included for each row of the light map. The repeat count could indicate how long the current row of the light map is to remain in programmable LED drivers 108 before the next row is sent from light map storage 102. A single dark row could remain in programmable LED drivers 108 for several hours during the emulated night. The time/date stamp of the next row in the light map could be compared to the date and time from the RTC and the LED intensities updated only when the date and time match.

Light maps may also vary from day-to-day. In one embodiment, a 24-hour light map remains constant for several days or weeks during a growth phase. Then the 24-hour light map is changed for a second growth phase. Light maps could also be adjusted incrementally each day, such as to evaluate the lengthening of daylight during the spring.

Light maps may be created or specified on a host such as a personal computer (PC). The user uploads the light map to programmable luminaire 100 through host interface 106, which writes the light map to light map storage 102. Host interface 106 may use a standard communication protocol such as IEEE 1394, Universal-Serial-Bus (USB), Power Line Communication, or Local Area Network, or wireless such as Radio Frequency, Optical Communication, or wireless LAN i.e. WiFi.

Figure 4:
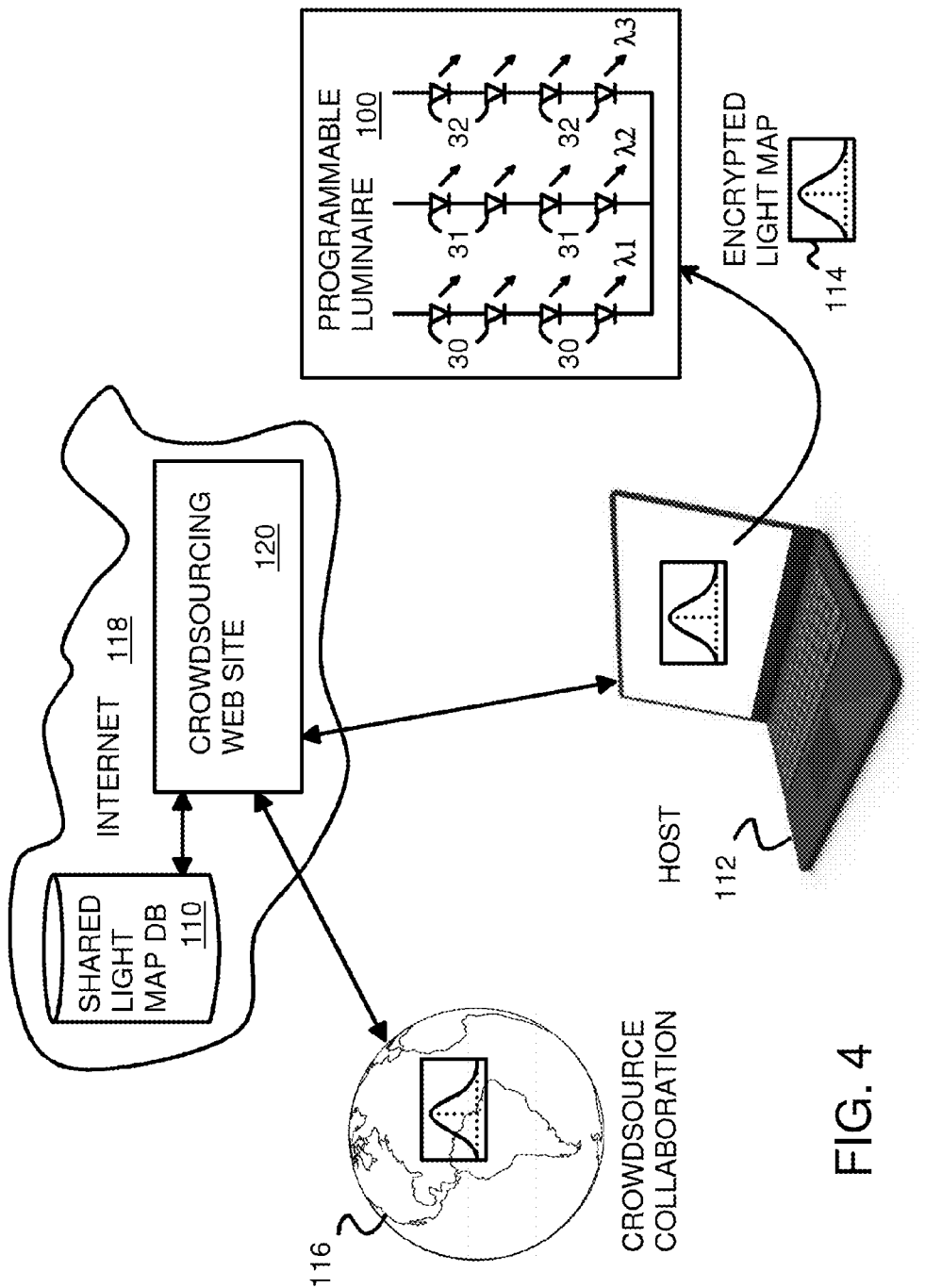
FIG. 4 shows a system for testing and optimizing light maps.

FIG. 4 shows a system for testing and optimizing light maps. A user on host 112 edits a light map to create a new light map which is encrypted and sent to Programmable luminaire 100 as encrypted light map 114. Programmable luminaire 100 decrypts and stores the light map. Programmable luminaire 100 then begins with growth stage 1 and to cycle through rows of the light map over several weeks or days. The programmed mix of wavelengths of light is applied to the plant during the programmed grow cycle.

The user can evaluate the results of the grow cycle upon completion. For example, the yield of the plant can be measured or estimated, such as the weight of fruit or vegetables produced, or the size or weight of the plant measured (biomass). Qualitative factors such as flower color, blossom timing, or abundance may also be evaluated. For plants other qualitative factors are secretion of enzymes, toxins, nutrients, or herbal medicine concentration. For algae, a tuned light map may result in an increase in biofuel production. Other objectives may include compressing the growing cycle so that more harvests can occur in fewer days, with more harvests in a year. These results can then be attached to the light map by the user on host 112. The user can adjust the settings of the light map to create a new light map that can be uploaded to Programmable luminaire 100 and another grow cycle can begin.

The user can thus adjust the settings of the light map and evaluate the results to optimize the light map. Once the user is sufficiently satisfied with the results, the user can upload the light map and results from host 112 to crowdsourcing web site 120 on Internet 118. The light map uploaded from host 112 is stored on shared light map database 110 and may be made available to other users of crowdsourcing web site 120. A large number of other users of crowdsourcing web site 120 can review the uploaded light map and the results and vote on the light map, or add comments about their likes and dislikes of the light map. Database 110 may be organized by a hierarchy of biological classification, such as by genus and then species.

Other users may download the light map from shared light map database 110 and modify the light map on their local hosts. These users can then test their modified light maps by programming their programmable luminaires 100 (not shown) and running a grow cycle using their modified light map. These users can then upload their results and modified light maps to database 110 via web site 120. Users (Clients of web site 120) can then vote on or otherwise evaluate the modified light maps.

The users of crowdsourcing web site 120 form a social collaborative network, crowdsource collaboration 116. Light maps from shared light map database 110 are evaluated, downloaded, modified, and experimented on by users of a social collaborative network, crowdsource collaboration 116. Light maps provide a standardized way for users to share lighting information. Programmable luminaire 100 can be mass produced and marketed so that other users can use light maps from shared light map database 110 to test on their plants. Light maps are interchangeable and can be easily communicated with a mass-produced luminaire 100. Collaboration from a diverse, decentralized group of users should speed optimization and distribution of light maps which may enable breakthroughs in organism lighting requirements for maximum yield.

Figure 5:
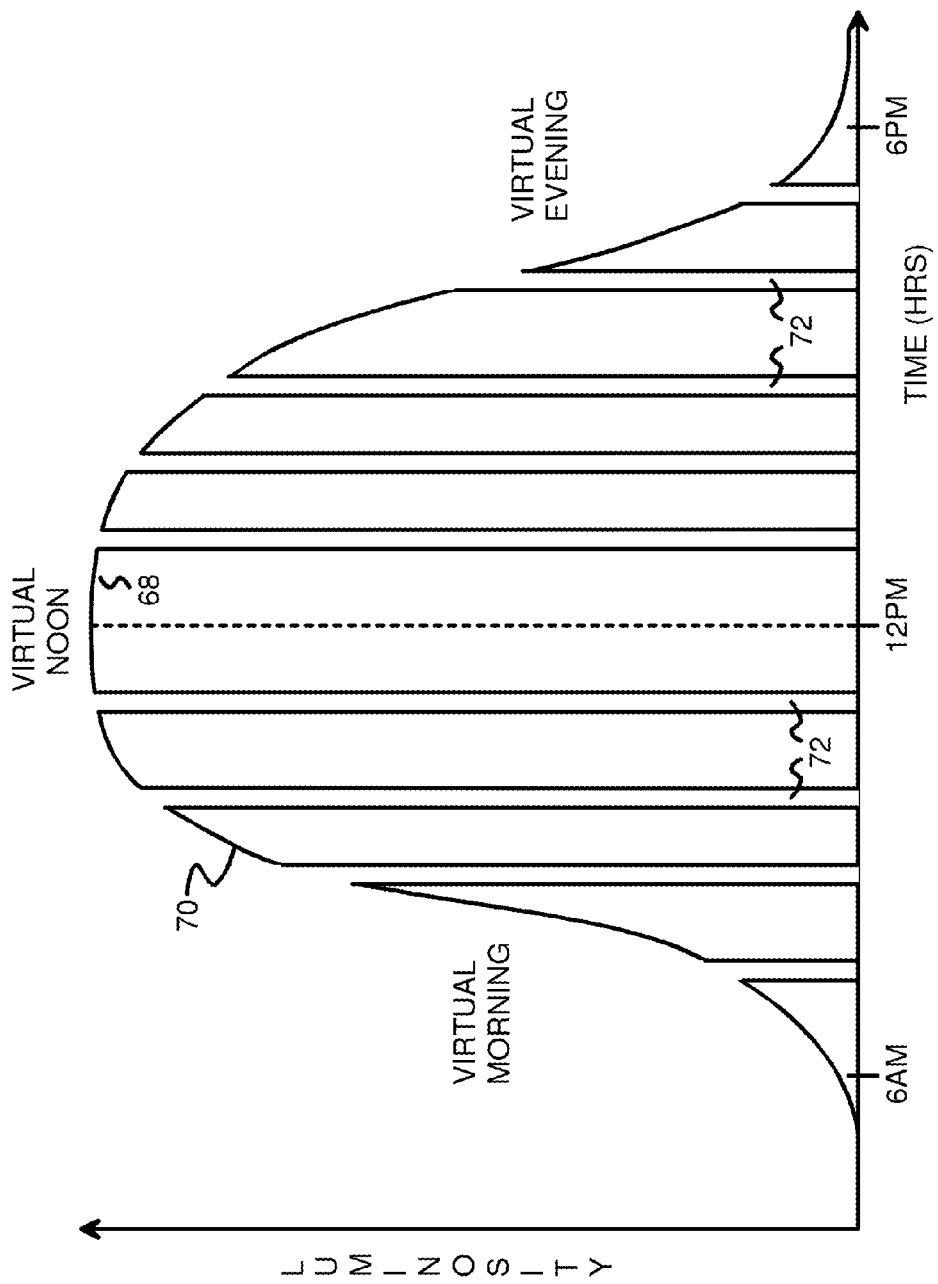
FIG. 5 illustrates a light map with sun fleck.

FIG. 5 illustrates a light map for a virtual day with sun fleck. The luminosity output from programmable luminaire 100 gradually rises during a virtual morning, rises more rapidly and reaches a maximum at the virtual noon, and falls rapidly in the virtual afternoon and then falls less rapidly during the virtual evening. Envelope 70 represents the light output that mimics a solar day. During the virtual night, little or no light is output from programmable luminaire 100. The number of hours of the virtual day can be adjusted, as can the maximum intensity at virtual noon.

While envelope 70 mimics the variation in light intensity during a solar day, natural light also varies in other ways during the day. For example, a plant on the ground may be shadowed by a tall tree. As wind blows past the tree, the tree's leaves and branches may sway, causing shots of sunlight to reach the plant on the ground. This is known as sun fleck. Sun fleck can be mimicked by turning some or all of the LED's in programmable luminaire 100 off and on during the virtual day. Envelope 70 thus has slats 72 where illumination falls sharply for a period of time before a burst of light. A simple embodiment is to turn off all LED's for a brief period of time at various intervals during the virtual day. Alternately, some but not all wavelengths may be shut off, since plants under a forest canopy are not completely in darkness. Forest-floor plants may especially benefit from sun fleck. The speed and duration of sun fleck may be programmable. The speed could be in the order of milliseconds to minutes.

Figure 6:
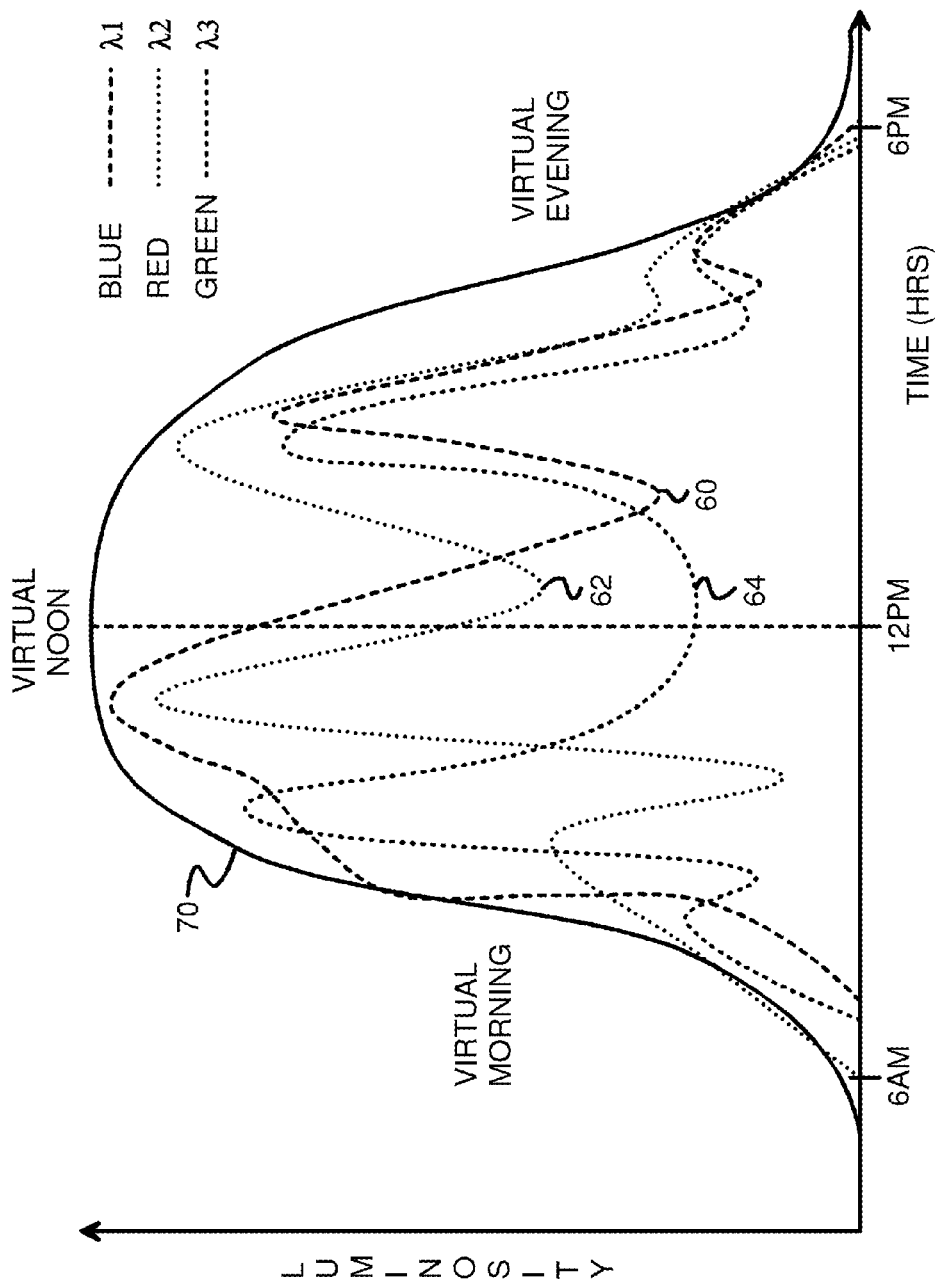
FIG. 6 is a graph of a light map showing some component wavelengths.

FIG. 6 is a graph of a light map showing some component wavelengths. Envelope 70 may be the sum of intensities of all LEDs for the various wavelengths. The various wavelengths of light may vary during the virtual day. For example, a blue wavelength λ1 shown by curve 60 rises rapidly during the virtual morning, but then dips near virtual noon. It has a brief peak in the virtual afternoon before falling during the virtual evening. A red wavelength λ2 shown by curve 62 has a trough during the virtual morning, then a peak before virtual noon. It dips after virtual noon but has a brief peak in the virtual afternoon before falling during the virtual evening. A red wavelength λ3 shown by curve 64 rises in the morning, then has a broader trough during the virtual noon. It has a brief peak in the virtual afternoon before falling during the virtual evening.

Figure 7:
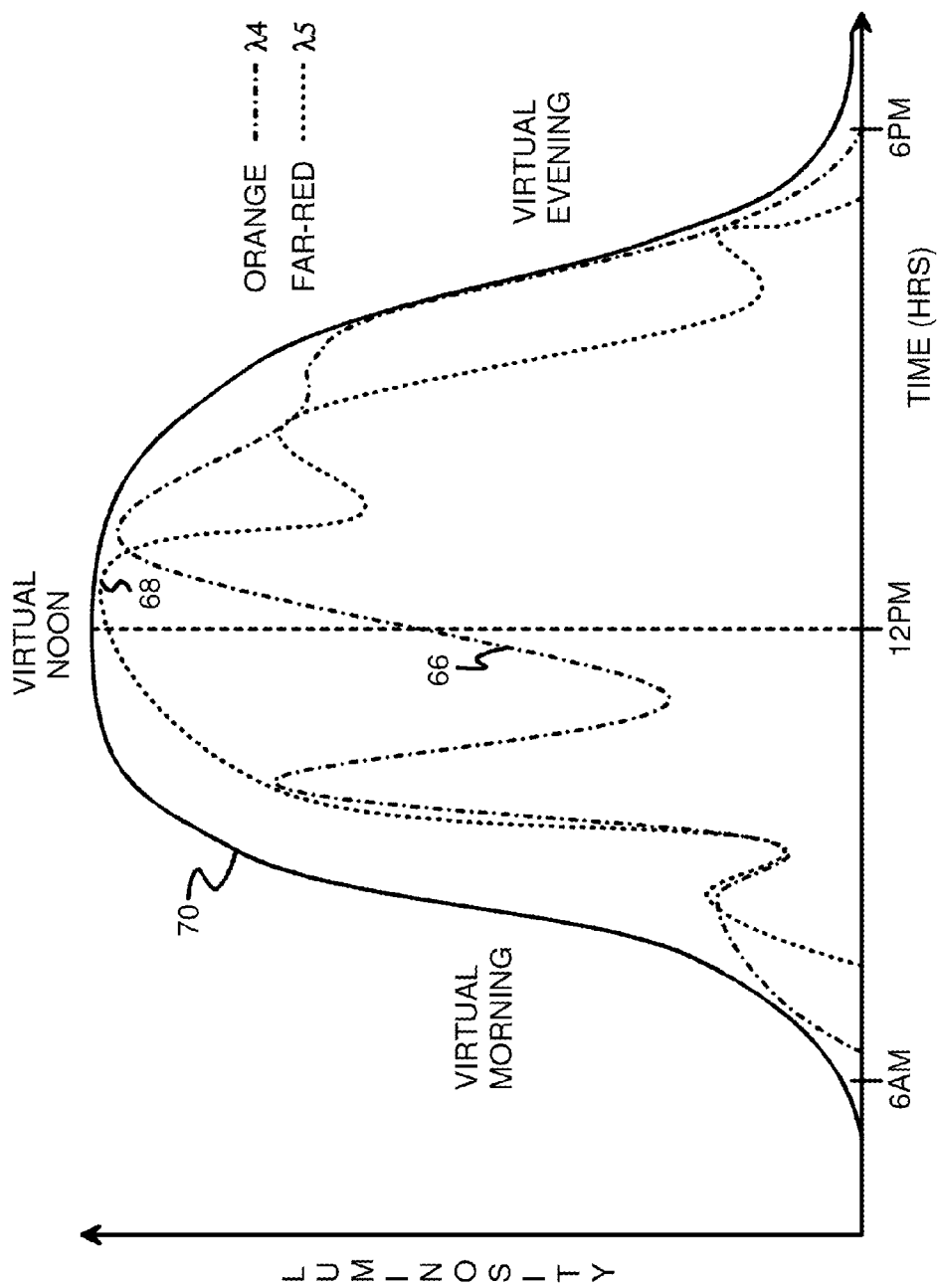
FIG. 7 is a graph of a light map showing some other component wavelengths.

FIG. 7 is a graph of a light map showing some other component wavelengths. An orange wavelength λ4 shown by curve 66 rises more slowly during the morning than red, green, and blue, but orange is more dominant during the virtual noon, the afternoon, and the evening. This allows a researcher to analyze the effect of different light wavelengths on living organisms. A wavelength mix may be isolated that affects an organism by increasing or decreasing a desired result. A far-red wavelength λ5, shown by curve 68, has a high peak at virtual noon, but falls rapidly and is absent from the virtual sunset as these far-red photons are scattered or absorbed by the atmosphere at low sun angles.

A wide range of wavelength mix sequences that do not occur in nature may be simulated by the light maps. Their affect on living organisms may then be evaluated. Some plant species may be sensitive to some effects (wavelengths) and not to others. Shade plants may have different lighting wavelength requirements than sun-loving plants. Plants from high versus low altitude areas, or short versus long day length may have different optimal lighting requirements.

Figure 8:
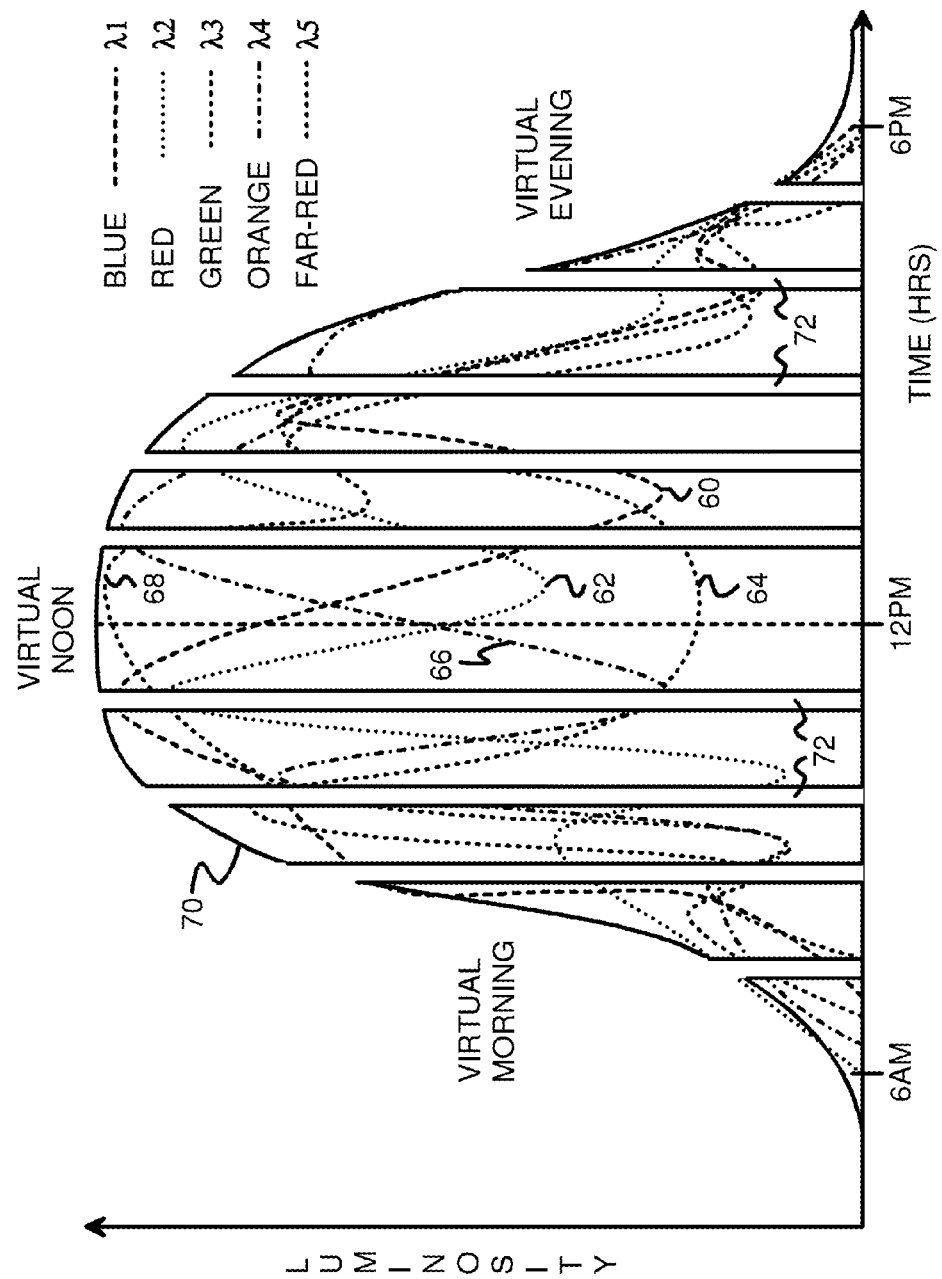
FIG. 8 shows a light map with component wavelengths overlaid.

FIG. 8 shows a light map with component wavelengths overlaid. The true light envelope shows the overall intensity from programmable luminaire 100 and is the sum of intensities of wavelengths shown by curves 60, 62, 64, 66, 68. However, for simplicity, envelope 70 as shown is the maximum allowed intensity of any one wavelength at a particular time during the virtual day. The superposition of curves 60, 62, 64, 66, 68 produces the true light envelope, which is roughly approximated by envelope 70.

During slats 72, all wavelengths of LED's are shut off to emulate sun fleck Thus a very complex sequence of wavelengths of light can be best described by a light map and used to drive LED's of different wavelengths in programmable luminaire 100. All wavelengths do not have to be shut off. Longer wavelengths such as red may remain on or at a lower intensity during a sun fleck.

The light map itself, as stored on a computer disk or memory, can be a table or list of values that are applied to drivers in programmable luminaire 100 that drive the different arrays of LED's, each producing a different wavelength. Each row in the table has the values for the different wavelength LED drivers for a point in time. After a time period, the next row of values can be read from light map storage 102 and applied to programmable LED drivers 108. Alternately, a first value in each row can indicate a time delay until the next row is fetched and applied to programmable LED drivers 108.

Figure 9:
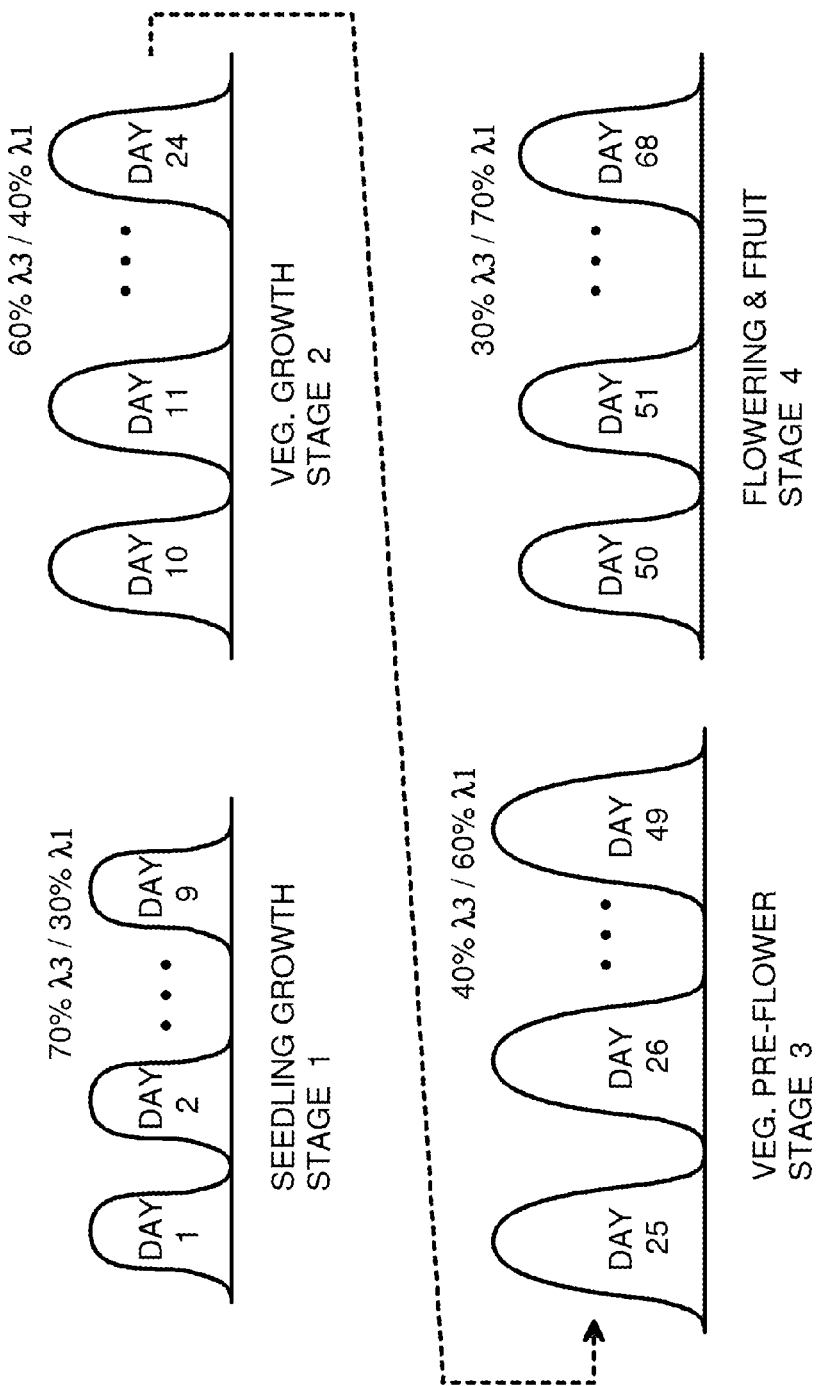
FIG. 9 highlights a multi-day light map covering several growth stages in a grow cycle.

FIG. 9 highlights a multi-day light map covering several growth stages in a grow cycle. A plant has a grow cycle of many weeks or months that can be divided into several growth stages. The number of days in a stage shown herein are only examples and may differ by plant type.

Stage 1 is the seedling stage where the seeds germinate. This stage has 9 virtual days of a wavelength mix of 70% blue. Blue light is thought to promote vegetative growth. Far Red light affects seed germination, but only a small amount is needed to initiate germination The same daily light map may be used for all 9 days in stage 1.

Stage 2 is the vegetative growth stage where the plant grows. The light wavelength mix is adjusted for this stage with red increasing to 40% and blue dropping to 60%. The increased red light allows for optimized photosynthesis during the 14 days of this stage.

Stage 3 is the vegetative pre-flower stage. The light wavelength mix is adjusted with red increased further to 60% while blue drops to 40%. The increased red light may trigger changes in the plant to start forming flowering structures. This stage is 24 days long, and the same daily light map is applied each day in this stage.

Finally, stage 4 is the flowering and fruiting stage. The red wavelength is adjusted further to 70% while blue drops to 30%. The increased red light may trigger the plant to flower and bear fruit. This stage is 18 days long, and the same daily light map is applied each day in this stage.

The timer in programmable luminaire 100 indicates when to switch to the next stage's light map after the programmed number of days for that stage elapses. The timer has two functions. The programmable luminaire OS uses the timer to trigger jumping to a next row of wavelengths settings during a virtual day, such as every 5 minutes, 15 minutes or 30 minutes, etc, The timer is also used by the OS to know when to go into the next growth stage. In an actual light map, the light may be a mixture of many more wavelengths, and some of these wavelengths may be found to trigger changes in the plant's behavior.

Figure 10:
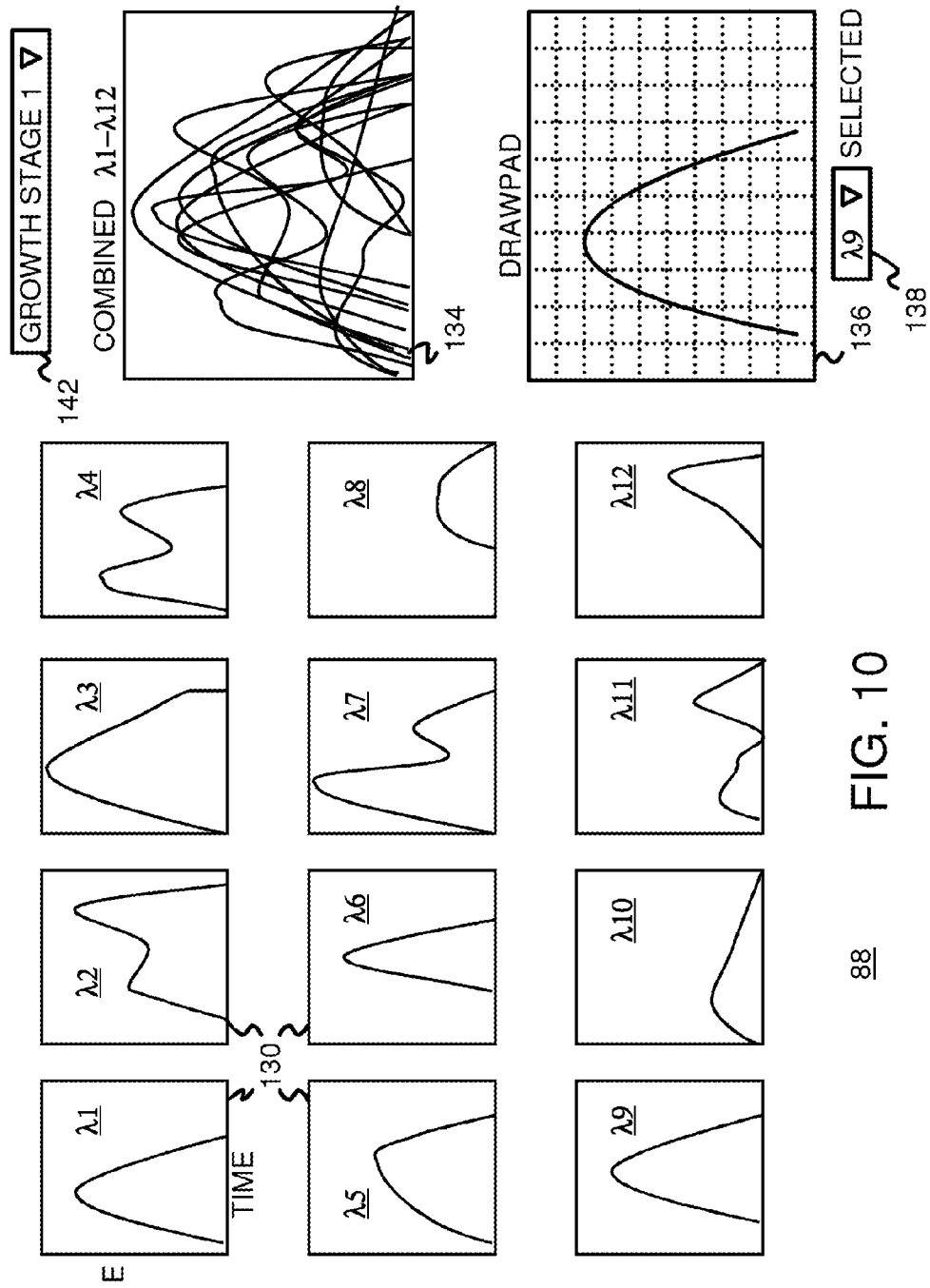
FIG. 10 shows a graphical-user-interface (GUI) light-map editor.

FIG. 10 shows a graphical-user-interface (GUI) light-map editor. GUI light-map editor 88 can be a software program distributed with programmable luminaire 100. GUI light-map editor 88 is executed by host 112 to edit a light map. A light map may be formatted as a lookup table of rows and columns of date/time wavelength settings. Light maps may be downloaded from crowdsourcing web site 120. Basic light maps may be included that can be modified by the purchaser.

The user specifies how he wishes to modify the wavelengths for a virtual day by using GUI light-map editor 88 to create a light map. An existing light map from shared light map database 110 can be downloaded into GUI light-map editor 88 and used as is, modified, or the user can create a new light map from scratch.

GUI light-map editor 88 displays a series of wavelength windows 130, each showing the virtual day's curve for one wavelength of light. Some wavelengths $\lambda 1, \lambda 3, \lambda 5$, etc. show a single peak during the virtual day, while other wavelengths $\lambda 2, \lambda 4, \lambda 7, \lambda 11$ show two separate peaks during one virtual day. Some wavelengths $\lambda 3, \lambda 7$ have intense peaks, while other wavelengths $\lambda 10, \lambda 11, \lambda 12$ have low intensity peaks.

The user can edit an individual wavelength by selecting the wavelength from drop-down box 138. The selected wavelength curve is then displayed in draw pad window 136. The x axis is the time and the y axis is the intensity. The user can then use standard drawing tools such as line and curve editors to move points in the curve and change the shape, size, and location of the wavelength curve within draw pad window 136. The user could also select from several pre-defined curve shapes that are available as templates in the drawing tools of draw pad window 136.

Once the user finishes editing the wavelength curve in draw pad window 136, the wavelength's curve shown in its corresponding wavelength window 130 is updated. The user can save his edits by pressing a save button (not shown) or a typing keyboard shortcut or command, or simply moving to a different wavelength using drop-down box 138.

Combined wavelength window 134 shows all wavelengths overlaid upon each other. The user can see how the wavelength colors shift relative to each other during the virtual day. The maximum intensity and day length envelope 70 (FIG. 7) could also be displayed in windows 134, 136.

The user also selects which growth stage the light map is for by using drop-down box 142. There may be additional controls (not shown) to specify the number of growth stages, the number of days in a growth stage, the maximum noon intensity during a growth stage, the length of the virtual day in a growth stage, and other variables. Sun fleck could also be specified, such as by dimming some of the wavelengths for a specified period of time during the day.

Figure 11:
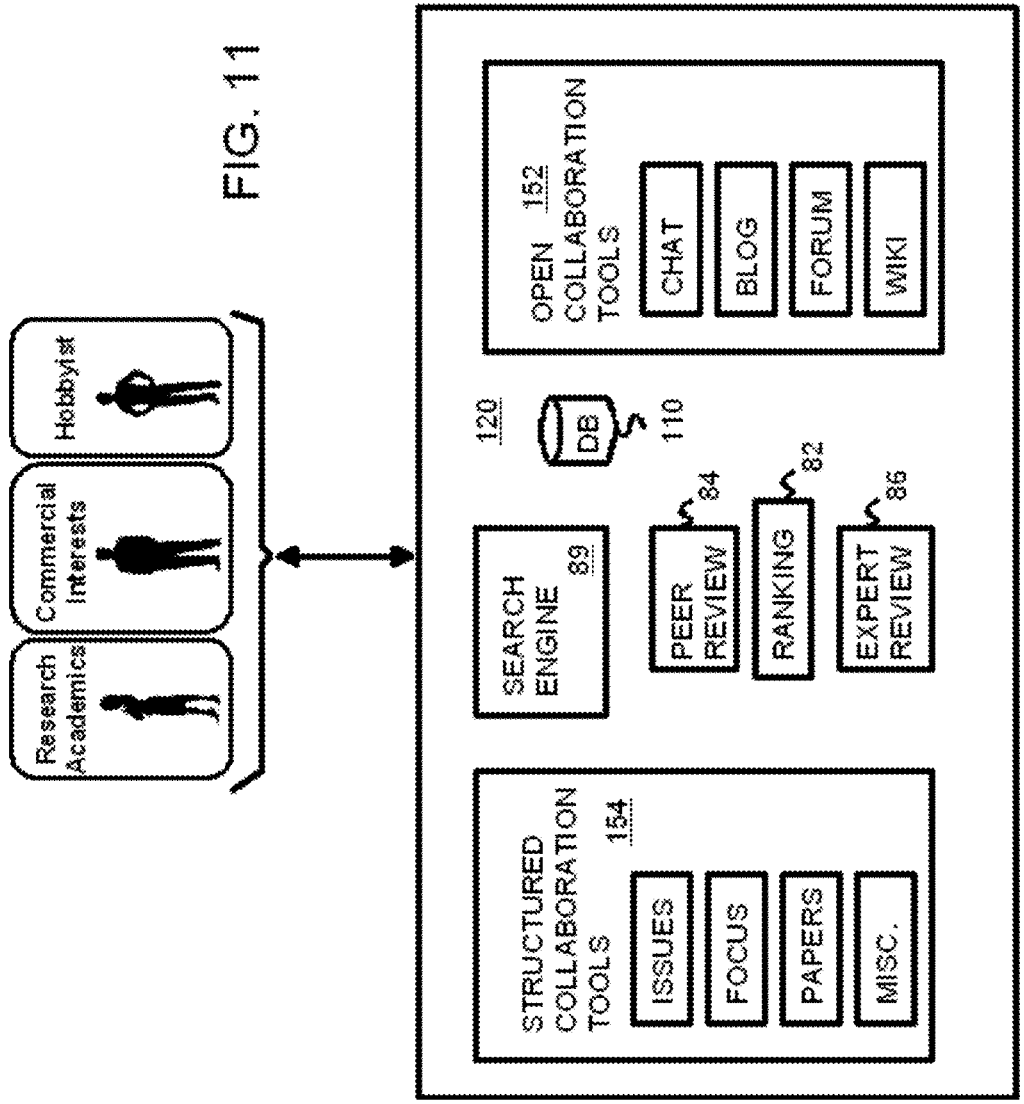
FIG. 11 shows a crowdsourcing web site.

FIG. 11 shows a crowdsourcing web site. The web site may support some or all applications such as plant, algae, human, insect, farm animal, bacteria, fungus, or any living organism that is being studied with regards to its reaction to different light wavelength stimuli. A wide variety of users can access crowdsourcing web site 120 over the Internet. Users can include hobbyists, commercial interests, and research academics. Users can search and download shared light maps stored in shared light map database 110.

Light maps are locally modified on the user's platform (PC, Smartphone, etc). The user can activate Search Engine 89 to search the contents of the website. Users can use these light maps to download into their programmable luminaire 100 (FIGS. 3-4) and use as is to run a grow cycle on a plant of their choice. Preferably, a light map design matches their plant type. The user can then evaluate yields and other criteria and if they choose can post these results, along with the modified light map, back to shared light map database 110. The upload is voluntary.

When the user uploads a light map to shared light map database 110, crowdsourcing web site 120 collects reviews from other users. Peer review module 84 collects reviews from users who view the light map and its results, and give feedback. The user feedback can be a simply like/dislike vote that the user click on when viewing the light map and results, or may be a more complex feedback such as a multi-question or multi-criteria evaluation.

Expert users, such as those in research academia, may give feedback using expert review module 86. The opinions of the experts collected by expert review module 86 may be given a higher value than those of general users collected by peer review module 84. Ranking module 82 uses a ranking algorithm to generate a rank for each uploaded light map, using expert and peer feedback, yield results, and possibly other factors. This rank can then be displayed with the light map, or used to show top-ranked light maps to a user when using search engine 89. The hierarchy of biological classification is used to sort the living organisms. The ranking may be done according to hierarchy, such as ranking by species, the lowest level.

Light map response outcomes will improve as more users submit their light maps and results for actual implementation, review, and ranking by crowdsourcing web site 120, and top-ranked light maps continue to get downloaded, used, and tweaked by other users. Collaboration is also promoted by collaboration tools available at crowdsourcing web site 120. Open collaboration tools 152 are available to all users, and include chat, blog, forum, marketplace, and wiki tools that allow users to communicate their views and evaluations. These tools allow users to link their comments to specific light maps. The rank of a light map can increase when another user links to the light map using collaboration tools.

Structured collaboration tools 154 have one or more moderator or leader that controls the communication. These can include papers that are submitted and reviewed before publication, discussions on moderator-selected issues, focus efforts, and other miscellaneous topics or services. An example of a focused effort is the need to find light interaction with algae to generate a special enzyme.

Figure 12:
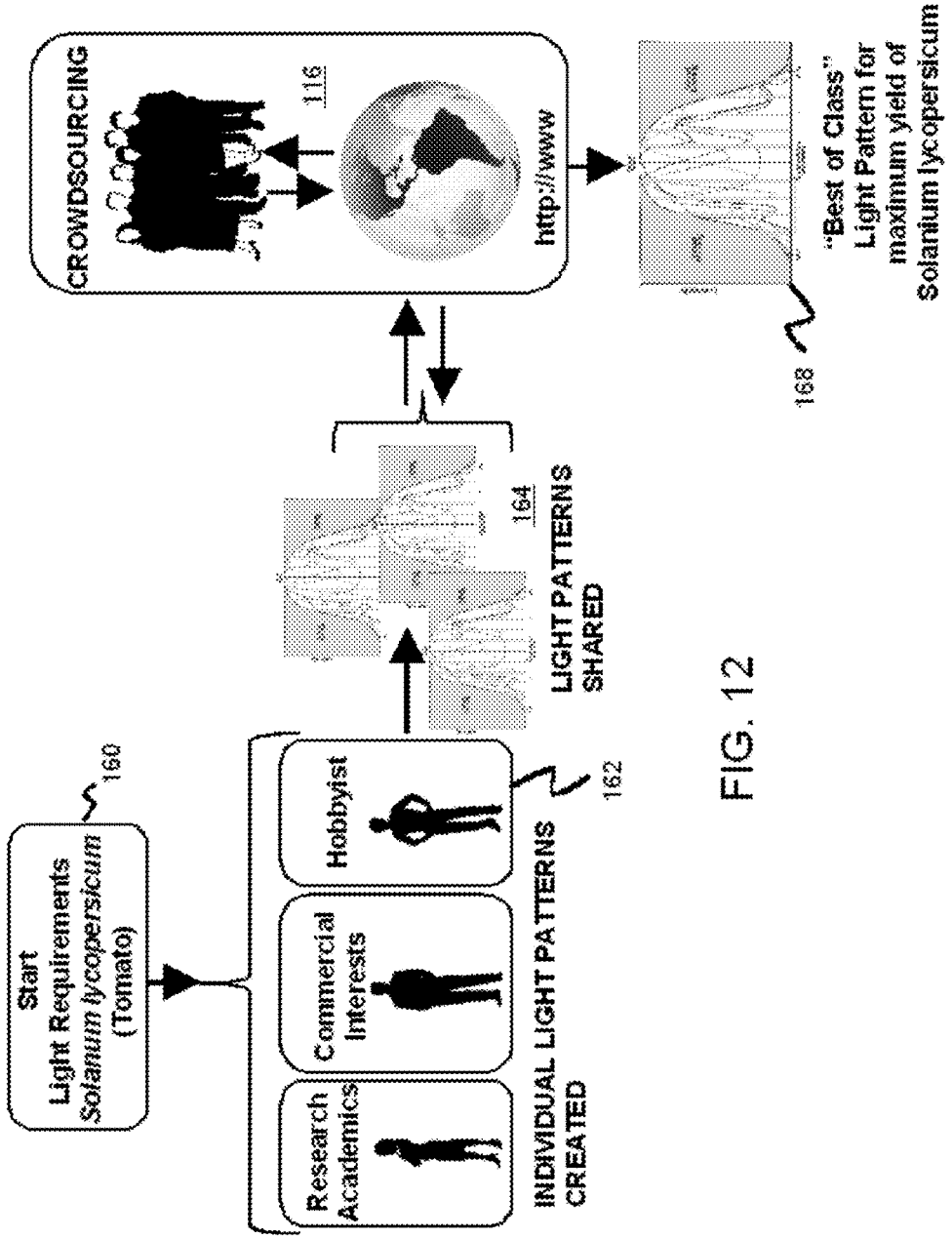
FIG. 12 highlights optimizing light maps by crowdsourcing using the crowdsourcing web site and the programmable luminaire.

FIG. 12 highlights optimizing light maps by crowdsourcing using the crowdsourcing web site and the programmable luminaire. A user has a need to grow a species of plant, such as a Solanum lycopersicum (tomato), and specifies this plant requirement 160. The user searches shared light map database 110 or creates a light map to meet this plant requirement and tests this light map by running a grow cycle on programmable luminaire 100. The user may post plant requirement 160 to crowdsourcing web site 120, and other users may also develop light maps and test them on their own programmable luminaire 100. Thus several user-created light maps 162 are created and tested. The light maps and results are independently uploaded by these users to crowdsourcing web site 120 and stored in shared light map database 110 as shared light maps 164. These shared light maps 164 are then evaluated by crowdsource collaboration 116 and ranked using ranking module 82 integrated in the crowdsourcing web site.

The distributed problem-solving capability of users (crowdsource collaboration 116) and ranking module 82 symbiotically selects best-of-class light map 168 by tapping into the wisdom of the crowd who will gravitate to the best performance light map for a specific species. Light map requirements are developed, tested, evaluated, and ranked by a diverse group of people that include hobbyists, commercial interests, and research academia. Good ideas may come from any of these sources, anywhere in the world. Crowdsourcing is most effective when the crowd is diverse and users act independently so that users bring different pieces and thinking together. The crown is decentralized so that no person at the top is dictating results. Crowdsourcing web site 120 provides a way to collect and disseminate diverse users' light map variations, results, and opinions. Ranking of shared light maps 164 can identify best-of-class light map 168 as the top-ranked light map.

Figure 13:
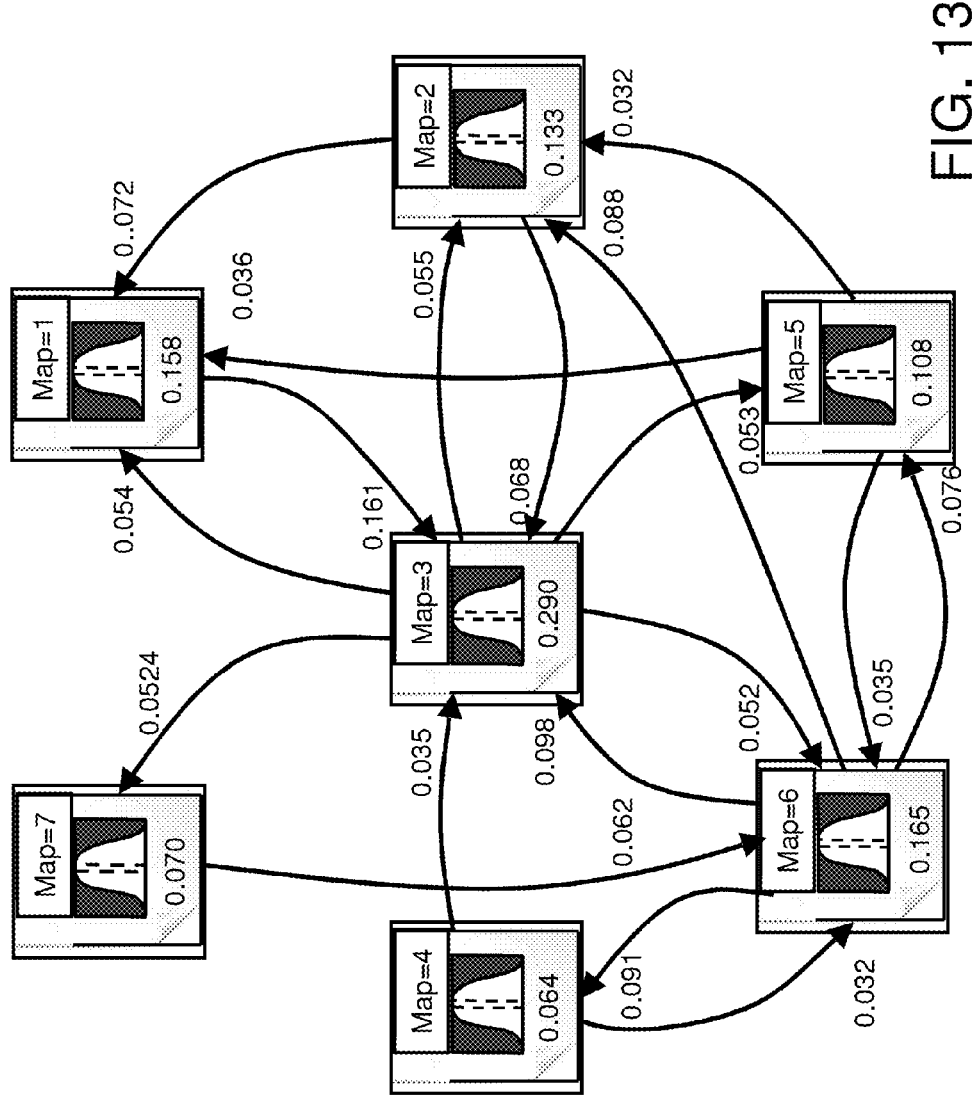
FIG. 13 highlights ranking of shared light maps.

FIG. 13 highlights ranking of shared light maps. Ranking module 82 of crowd sourcing website 120 uses a ranking algorithm to determine a light map's importance and relevancy with respect to plant requirements. Ranking module 82 is developed and updated over time so that the best performing light maps are filtered out from the many submitted light maps. Because light map contributors include academics, commercial interests, and hobbyists, there will be a wide range of light-map settings submitted to crowdsourcing web site 120.

FIG. 13 shows seven light maps and the weighting values assigned by various factors. The rank for a light map is shown inside the box for the light map, while weighting factors are shown in arrows pointing to the box.

The weighting factors may include:
1) How often a light map is downloaded.
2) Who was the originator of the light map, and his/her track record. Academic institutions are given higher weighting factors, followed by commercial interests. Hobbyists are given the lowest weighting factors. However, a contributor with a continued string of successful light maps receives a higher weighting factor.
3) How many times a light map is used as a template for other light maps.
4) The reported results (yield, plant size, etc.).
5) The number of like or dislike votes submitted by other users.

The weighting factor may be similar to a page rank used by web search engines for ranking and searching the many web pages found on the internet. The more of these weighting factors directed at a light map, the higher its overall ranking calculated by ranking module 82. Ranking module 82 uses all of the above factors to calculate an overall ranking for each light map uploaded to shared light map database 110.

FIG. 13 shows a ranking for a specific plant species. Map 3 in the center has a calculated ranking of 0.290. This is the highest ranked map in FIG. 13. Map 3 will show up at the top of the search list generated when someone searches for a light map for that specific plant species. All the weighting factors pointing to Map 3 are a result of light map factors listed above.

For example, factor 0.161 (pointing from Map 1 to Map 3) could be from an academic contributor who received good results using Map 3 to generate his Map 1. Because Map 1 used Map 3 as a source, Map 1 receives a weighting factor of 0.054 because of using highly ranked Map 3 as its template. Map 6 has a ranking of 0.165 since many light maps reference Map 6. However, because Map 6 is contributed by a hobbyist (or its yield results are low) Map 6 has a ranking of only 0.165, not much more than the ranking of Map 1, which only has 4 light map references, but has a calculated ranking of 0.158.

A user accessing search engine 89 of the crowdsourcing web site 120 submits search criteria such as plant or animal species, desired yield (fruit, flower, vegetative mass, egg size, body mass), etc. The light map search results appear in order of their ranking with a short description of the application results, similar to a web search result.

Figure 14:
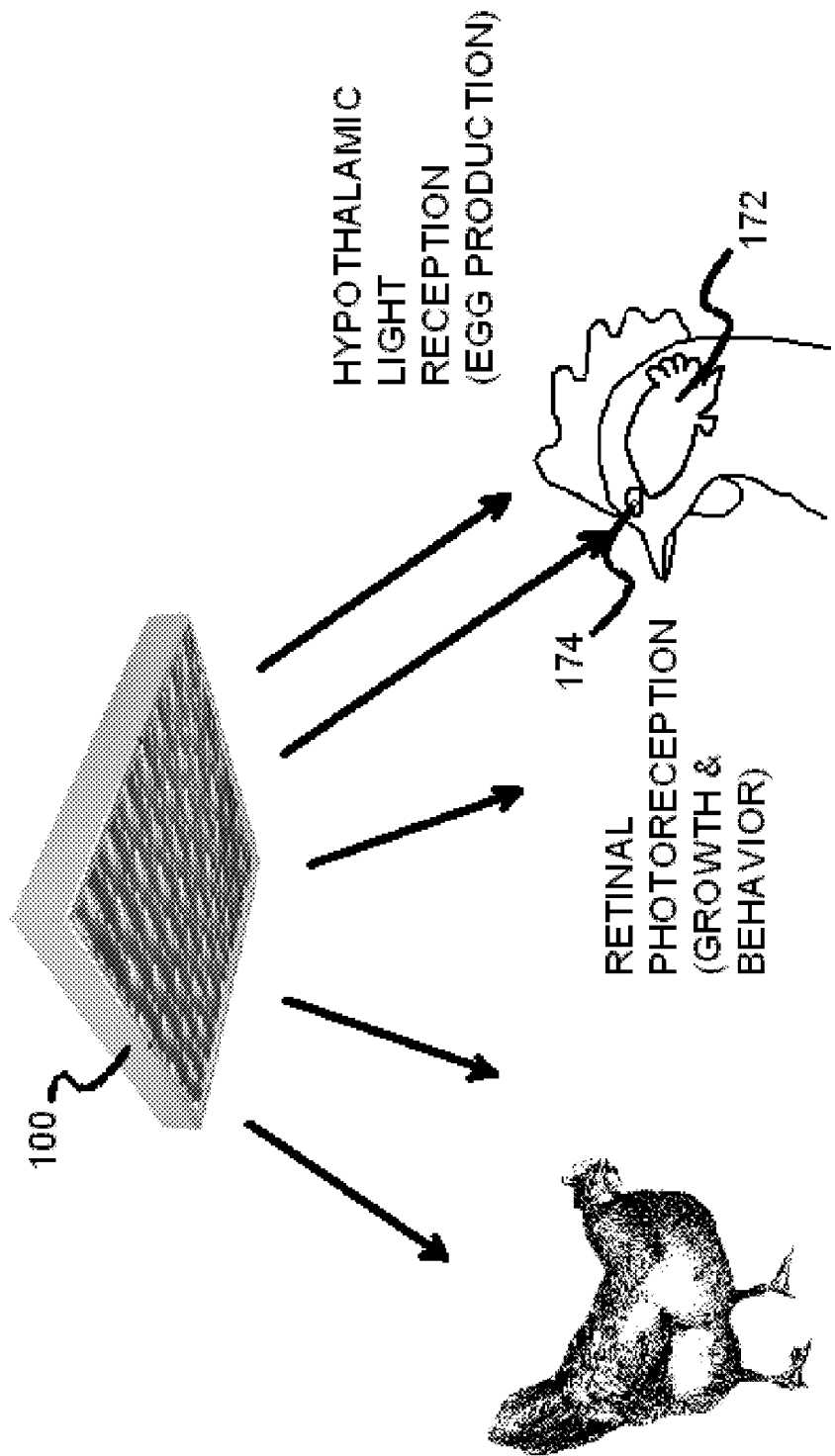
FIG. 14 highlights using the programmable luminaire on an animal.

FIG. 14 highlights using the programmable luminaire on an animal. While programmable luminaire 100 has been described as providing light for a plant, it can also be used for animals. Chickens are known to be sensitive to light. More than 50 billion chickens are reared annually as a source of food, for both their meat and their eggs. Chickens farmed for meat are called broiler chickens, while those farmed for eggs are called egg-laying hens. Sixth-eight percent of eggs, and 74 percent of the world's poultry meat are raised using intensive farming techniques where many chickens are housed in large poorly lit buildings. Artificial lighting is used for these buildings since these poultry are not exposed to natural sunlight.

Programmable luminaire 100 shines light that is received by the retina in chicken eye 174. The light received by chicken eye 174 influences growth and behavior of the chickens through retinal photoreception. The hypothalamus in chicken brain 172 also is influenced by light from programmable luminaire 100, and may influence egg production through hypothalamic light reception. Poultry differ from mammals in that light penetrates their skull to influence the hypothalamus. Longer wavelength Red is easier for skull penetration to the hypothalamus (brain) making it more sexually stimulatory than blue or green. Poultry have four types of cone in the retina of the eye. Poultry probably see color differently from trichromatic humans. Wavelength has an unquestionable effect on poultry production. Growth and behavior responses depend principally on retinal photoreception, whereas photosexual responses are mainly influenced by hypothalamic light reception.

It is not well understood how wavelengths affect egg production or other behaviors of chickens. Using light maps tested with programmable luminaire 100, it may be discovered that certain wavelengths of light are more important than others. Poultry lights could be developed that emit only these important wavelengths, reducing energy loss and perhaps allowing animal behaviors to be fine-tuned.

Figure 15:
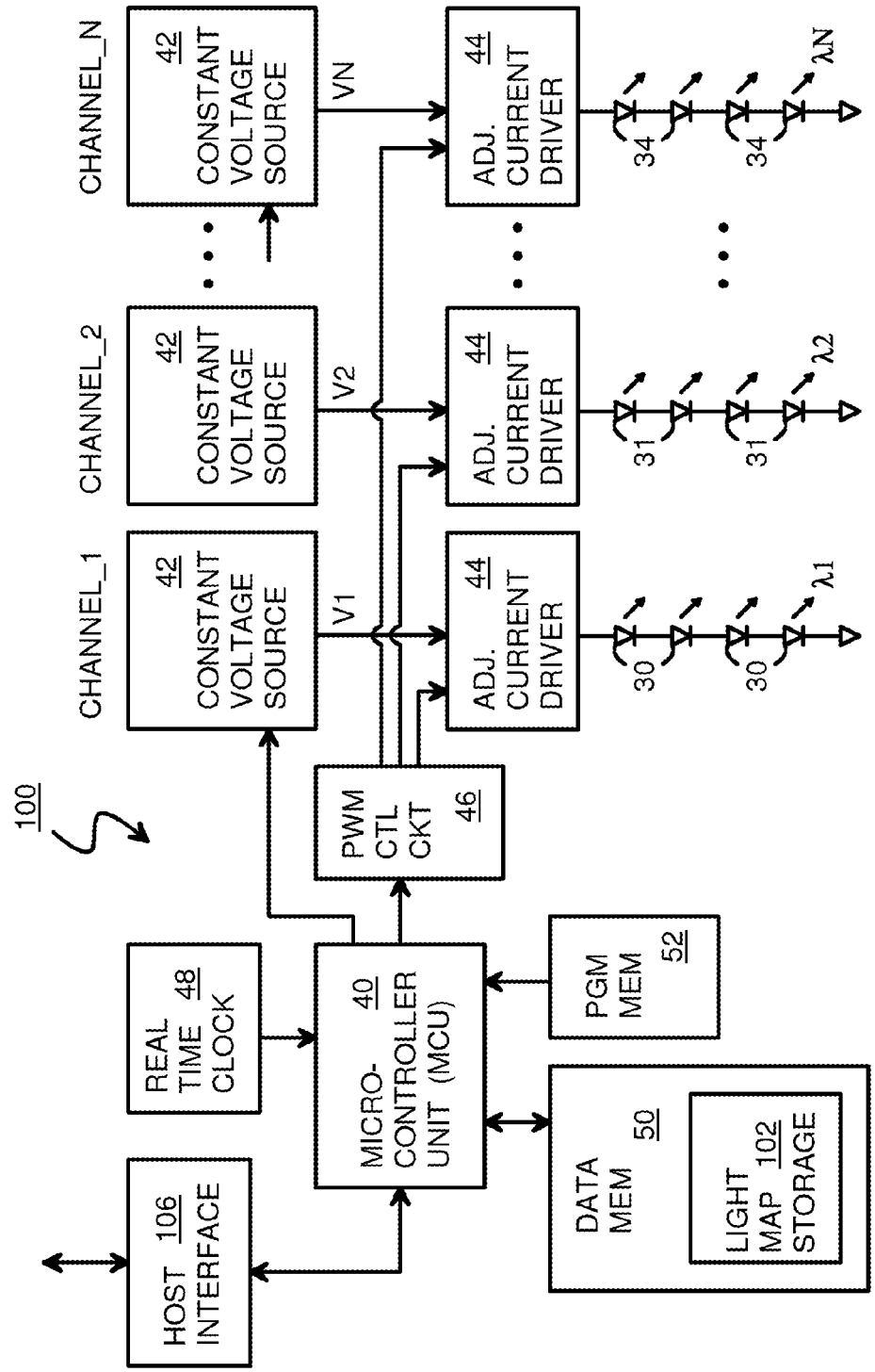
FIG. 15 is a more detailed schematic diagram of the programmable luminaire.

FIG. 15 is a more detailed schematic diagram of the programmable luminaire. Control programs and routines stored in program memory 52 are executed by microcontroller unit (MCU) 40. Program memory 52 can be a flash memory, ROM, or other non-volatile memory. Both program memory 52 and data memory 50 could be the same physical flash device, or could be separate physical memories. Programs in program memory 52 may be copied to data memory 50 before execution. Light maps uploaded from the host through host interface 106 are stored in light map storage 102 portion of data memory 50.

Microcontroller unit 40 responds to commands from the host through host interface 106. Commands can include storing a light map received from the host, and starting a grow cycle defined by the light map. Encrypted light maps may be decrypted by microcontroller unit 40 before storage in light map storage 102.

Real time clock 48 provides a clock that microcontroller unit 40 uses to track the minutes and hours in the virtual day, and days in a growth stage. A row of a light map indicates the time delay until the next row of the light map is to be fetched from light map storage 102 and applied to the LED's. When the time delay expires, microcontroller unit 40 reads the next row of the light map from light map storage 102, and reads the intensity values for the various wavelengths at that time point in the light map. There are several ways that microcontroller unit 40 can control the intensity of light from the LEDs to achieve the desired intensity specified by the light map.

Each of the LED arrays (LED's 30-34) are separately driven by adjustable current driver 44. A voltage V1, V2, . . . VN is generated for each adjustable current driver 44 by constant voltage source 42. The voltage generated by constant voltage source 42 is controlled by microcontroller unit 40. A higher current causes the LED's to output more light. The voltages V1, V2, . . . VN are adjusted for the particular type and number of LEDs in each array. LEDs of different wavelengths may have different forward-biased diode voltage drops. Microcontroller unit 40 controls the amount of current driven by adjustable current driver 44 to its array of LED's 30, 31, 34, allowing microcontroller unit 40 to generate the desired light intensity specified by the light map. In addition, the LED's can be pulsed off or dimmed by Pulse-Width-Modulation (PWM) control circuit 46, which is triggered by microcontroller unit 40 to dim some or all wavelengths of LED's. PWM control circuit 46 can be used to dim LED's for a brief period of time and then turn ON to emulate sun fleck. Also, PWM control circuit 46 may be used to pulse the LED's on and off at a high rate to study if plant leaves can integrate and use fast pluses of light as efficiently as continuous light.

The apparent intensity of an LED array can be adjusted by microcontroller unit 40 by adjusting the current from adjustable current driver 44, or by adjusting the percentage of time the LED's are turned off by PWM control circuit 46.

The current driven through an LED array can be adjusted by microcontroller unit 40 in response to a light map so that more light is produced at certain desirable wavelengths and less at other wavelengths. As more current is drawn through an LED, and for a larger fraction of the time, the intensity and light output of that LED is increased. The wavelength of light output from the LED is relatively constant as the current is varied, since the wavelength of photons emitted primarily depends on the semiconductor materials used in the junction of the LED.

Figure 16A:
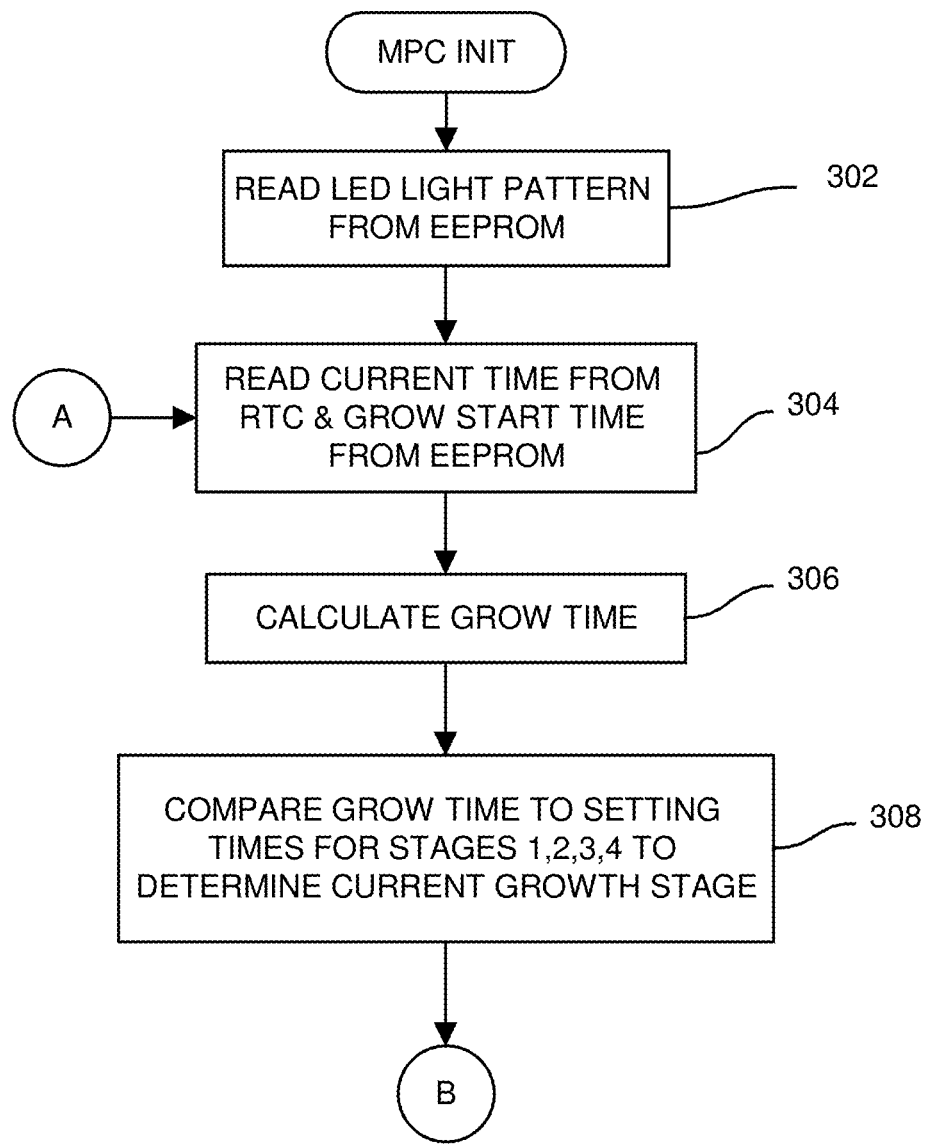
FIGS. 16A-B show a flowchart of operation of the programmable luminaire.
Figure 16B:
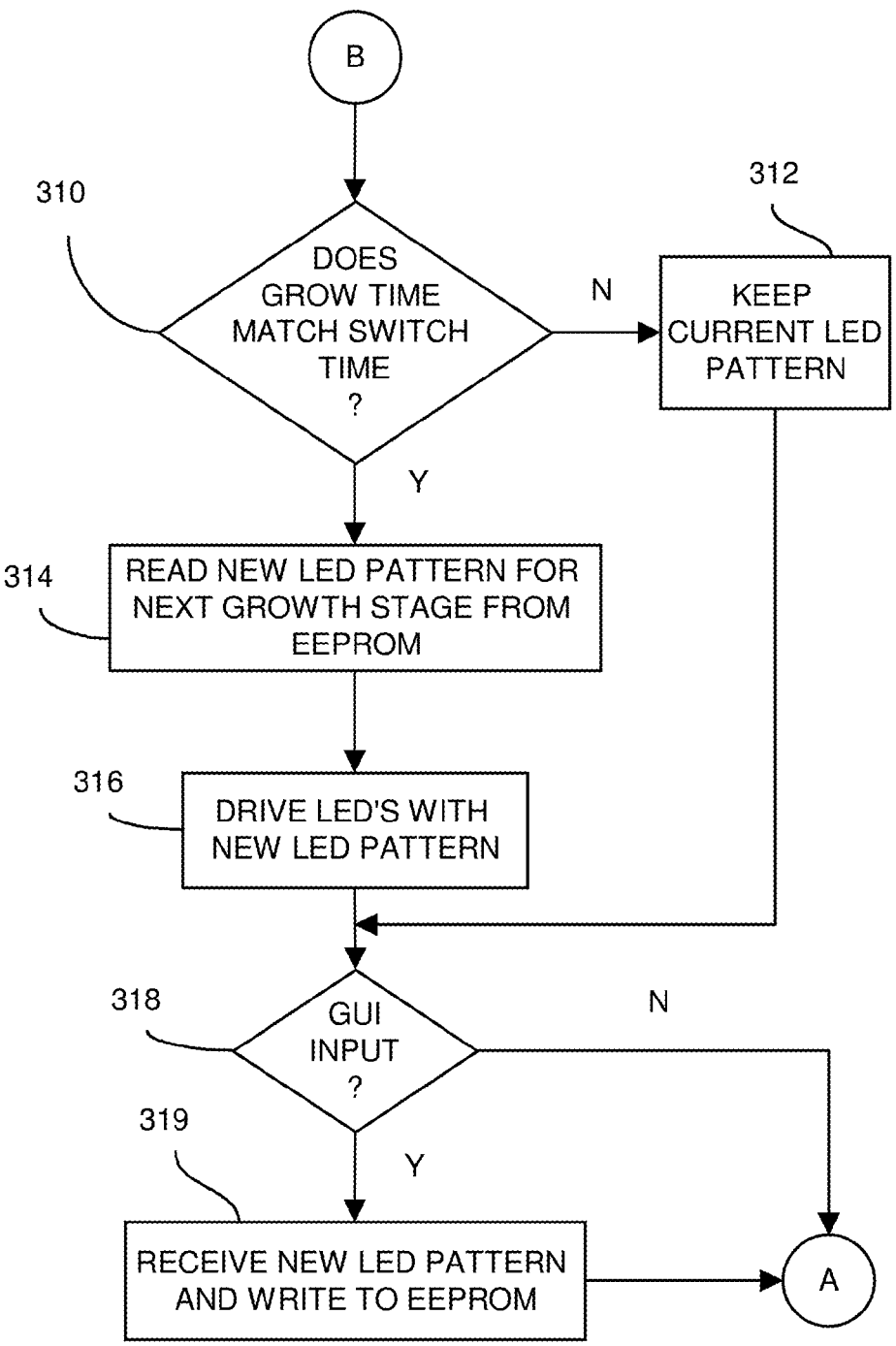

FIGS. 16A-B show a flowchart of operation of the programmable luminaire. When microcontroller unit 40 of programmable luminaire 100 is reset, powered-on, or initialized, one or more light maps have been stored in flash or EEPROM memory in light map storage 102. A default light map may be shipped with a new unit, or the user may have downloaded a modified light map from the host to programmable luminaire 100 before resetting programmable luminaire 100.

The current row of the light map is read from light map storage 102, step 302 Only a portion of the light map may be read initially. The current time and date are read from real time clock 48 and the grow start time read from flash or EEPROM, step 304. A new grow cycle is initiated by the host sending a command to programmable luminaire 100 to start the grow cycle, or by setting a time delay until the grow cycle starts, such as to begin at dawn the next actual day. Alternately, uploading a new light map to programmable luminaire may automatically trigger a new grow cycle to begin without an additional user command. When this new grow cycle begins, the time and date from real time clock 48 are stored into EEPROM.

The grow time is calculated from the stored grow start time and the current time from real time clock 48, step 306. For example, the grow start time can be subtracted from the current time to get the grow time, or length of time into the grow cycle. The grow time is compared to setting times that are specified by the light map, step 308. The setting times are the transitions from one growth stage to the next growth stage, or the end of the final growth stage. The current growth stage is thus determined. See FIG. 9 for examples of growth stages.

In FIG. 16B, the current grow time is compared to the setting times, step 310. When the grow time does not match any of the setting times, the current light map LED patterns is retained, step 312.

When the current grow time matches the setting time, the next growth stage is ready to begin. The next light map for the next growth stage is read from light map storage 102, step 314. The LED's are driven with this new pattern, step 316. Microcontroller unit 40 drives the programmable LED drivers to generate desired currents and voltages for lengths of times that generate the specified intensities for each wavelength.

The LED intensities also change throughout the virtual day as the light map specifies. For example, microcontroller unit 40 can read the light map and adjust LED settings every 5 throughout the virtual day, or microcontroller unit 40 can wait a length of time for each row of the light map and then update LED settings for the next row of the day. Alternately, each change in LED intensities throughout the virtual day can be considered a switch time that is detected in step 310.

When the user updates a light map on host 112 and downloads it from the host to programmable luminaire 100, a GUI input is detected in programmable luminaire 100, step 318. A new light pattern may be received from the host and stored into EEPROM such as light map storage 102, step 319. A command may also be received from the host and processed, such as a command to start a new grow cycle, end a current grow cycle prematurely, or send status information back to the host. The process can then repeat from step 304. This process is repeated once every 5 minutes.

Figure 17A:
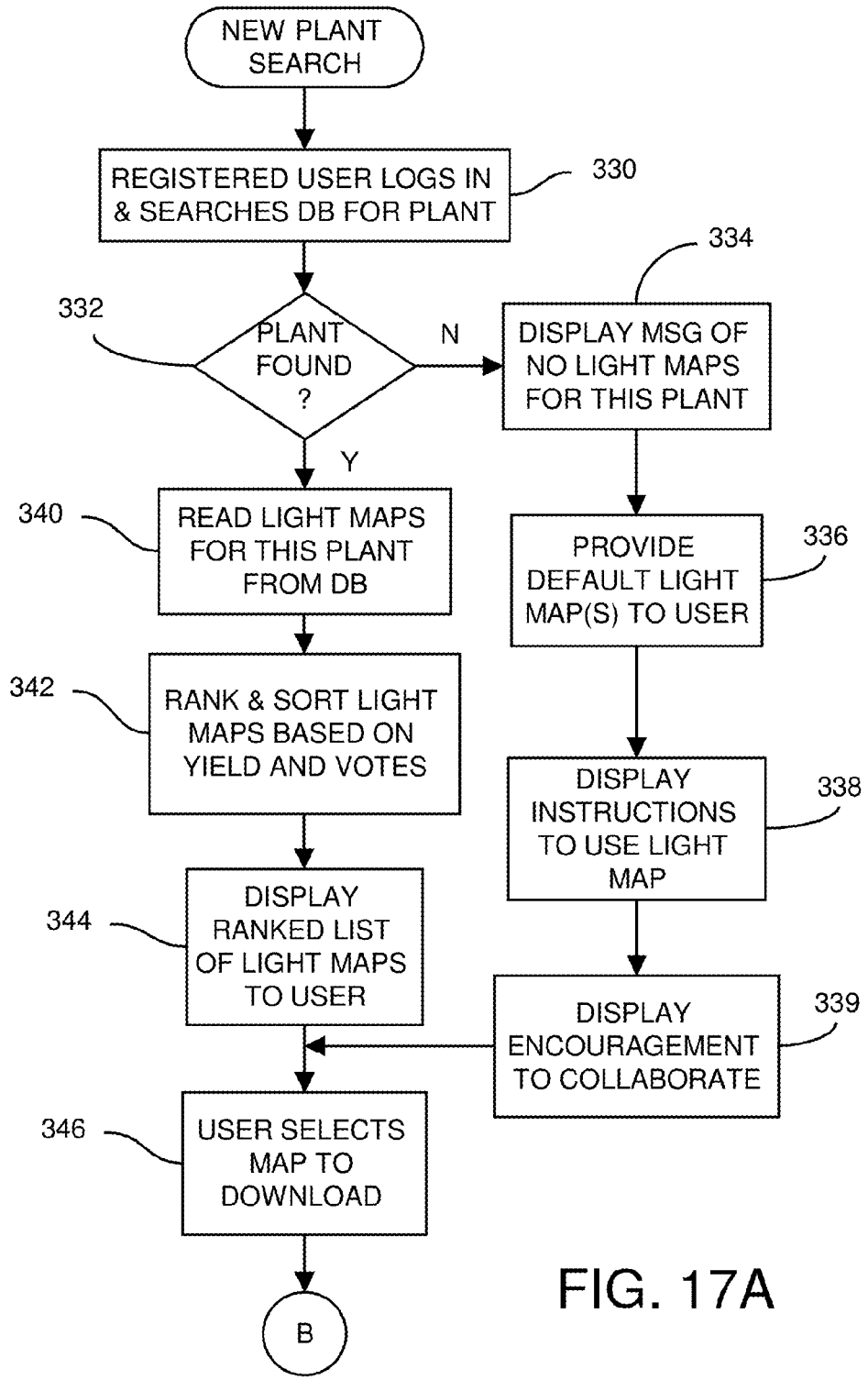
FIGS. 17A-C show a flowchart of using crowdsourcing to optimize light settings for a plant.
Figure 17B:
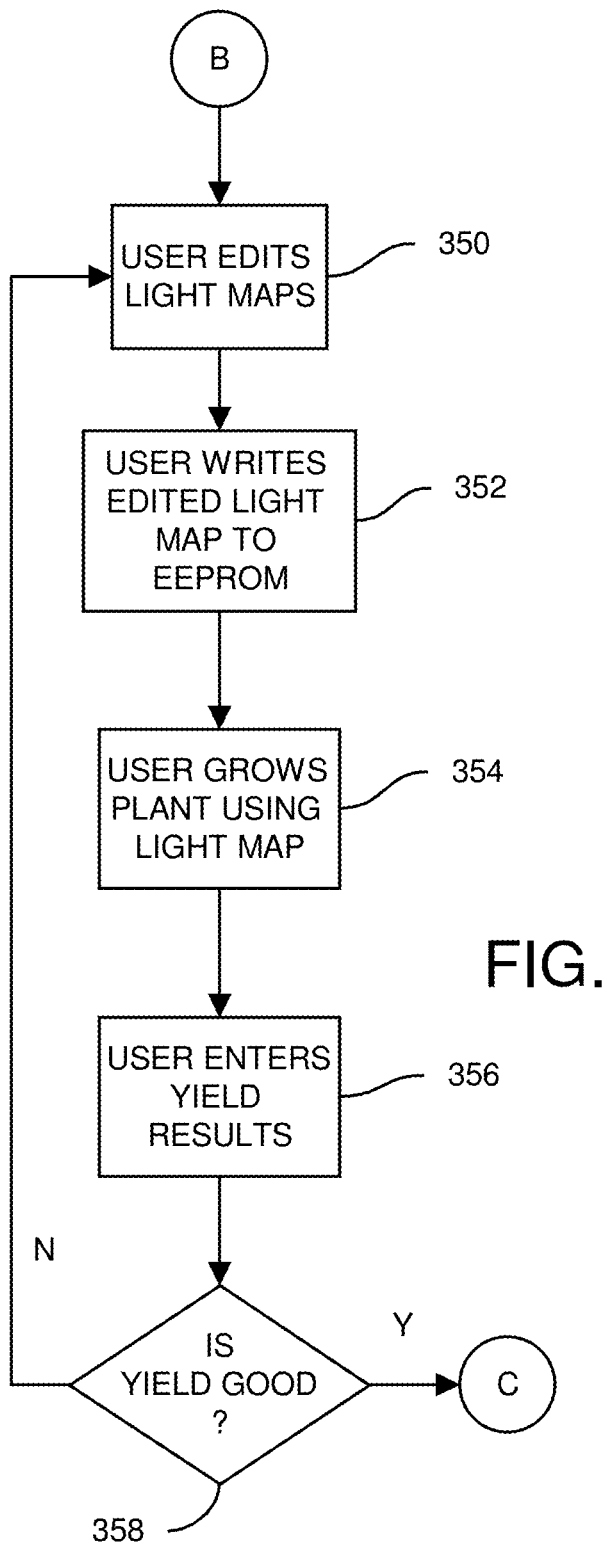
Figure 17C:
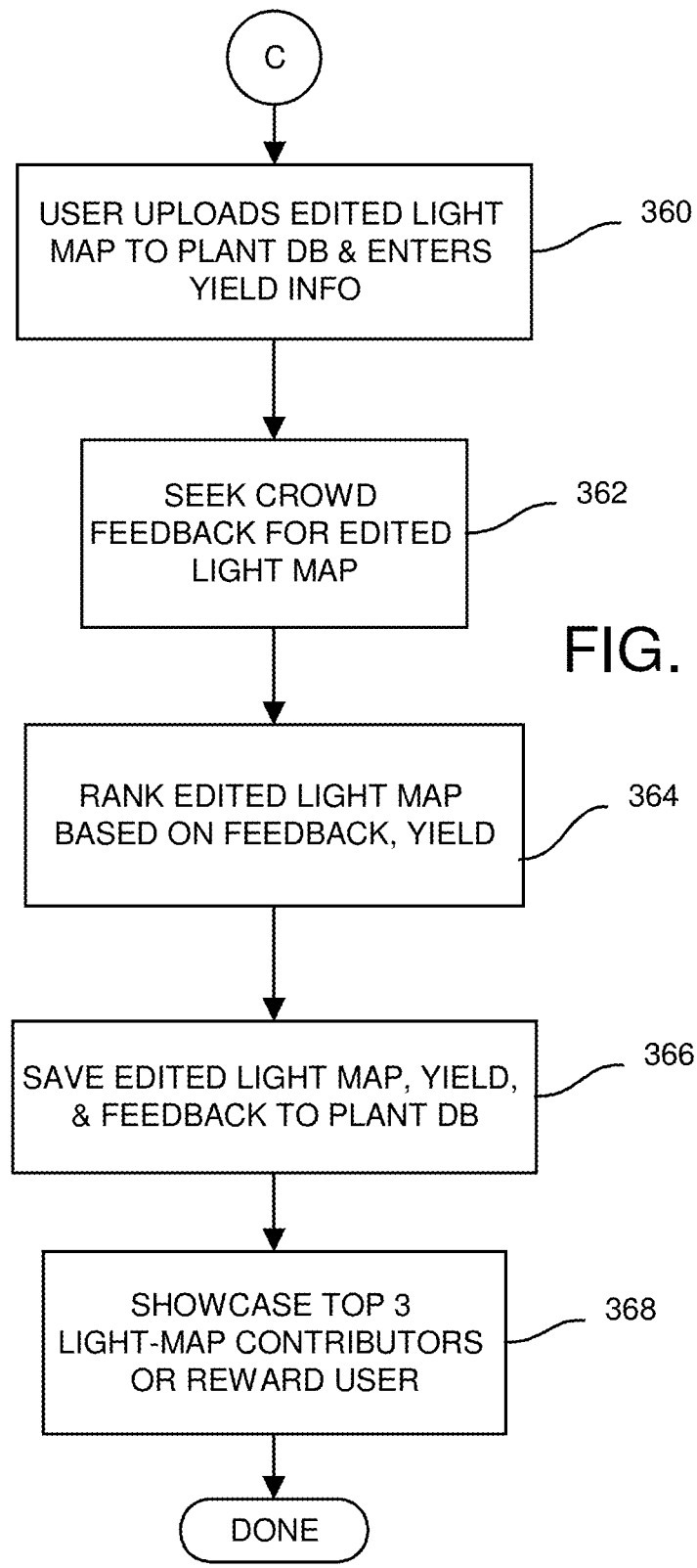

FIGS. 17A-C show a flowchart of using crowdsourcing to optimize light settings for a plant. In FIG. 17A, a user desires to search for light map settings for a new plant. The user logs on to crowdsourcing web site 120 and performs a search to the new plant, perhaps using the name of the plant species as a keyword, step 330. If a match in shared light map database 110 is found for this plant, step 332, one or more matching light maps for this plant are read from shared light map database 110, step 340. These light maps are ranked based on various factors, such as yield results and user votes, step 342. The list of matching light maps is then sorted by ranking values.

The ranked list of matching light maps is displayed to the user, step 344. The user then selects one of the matching light maps to download, step 346.

When no match in shared light map database 110 is found for this plant, step 332, a message is displayed to the user explaining that no match was found in shared light map database 110, step 334. A default light map, or a map for a similar plant species can be provide to the user, step 336. Instructions on how to use this light map may also be displayed, step 338, along with encouragement to collaborate and create a new light map for this plant species, step 339. The user then selects the default light map to download, step 346.

In FIG. 17B, when the light map is on host 112, the user can edit the downloaded light map, step 350, such as by using GUI light-map editor 88 show in FIG. 10. The user may change many or few wavelengths at different times of the virtual day, and for the different growth stages. The user may also change the length of the day, the number of days in each growth stage, and the overall intensities at virtual noon. Once the user is satisfied with the edited light map, the user sends the edited light map from the host to programmable luminaire 100, and the edited light map is written to EEPROM such as light map storage 102, step 252.

Programmable luminaire 100 then begins the grow cycle by comparing the RTC with light map time/date settings, and programmable luminaire 100 cycles through each virtual day for all growth stages, step 354. This may take several days, weeks or months. The plant grows until the grow cycle is completed. The user then evaluates the results, such as by weighing the plant or its fruit, counting flowers or fruit, or measuring the height of the plant. Other quantitative or qualitative measures may also be included in the results, such as the nutrient, chemical or enzyme content of the plant. The user enters these yield results into the host program, step 356, and evaluates these results. If the results are not satisfactory, step 358, the user can again edit the light map and run another grow cycle, repeating from step 350.

Once the user is satisfied with the grow results, or the user wants to post his results to crowdsourcing web site 120 as he continues to experiment with other edits to his light maps, step 358, the process continues in FIG. 17C.

The user uploads the edited light map from host 112 to crowdsourcing web site 120 and enters or uploads any yield or results information, step 360. The edited light map is stored in shared light map database 110. Crowd feedback can be sought for the edited light map, step 362, either at the request of the user, or automatically for all new light maps saved into shared light map database 110. Other users of crowdsourcing web site 120 review the yield and results and look at the edited light map and vote on the light map. Voting can be a simple like/dislike vote, a scale such as 1 to 10, or may include written comments or suggestions. Votes from academics or commercial interest may be given more weight than hobbyists, or votes from more experienced users may be weighted more heavily than for new users.

After receiving votes, the edited light map is ranked, step 364. Ranking was described in FIG. 13. Ranking may include both votes and yield results as well as linking. The feedback, votes, and ranking may be saved with the light map in shared light map database 110, or in a separate database, step 366. This information may be displayed to other users when the edited light map is found in a search of shared light map database 110. Also, the top-ranked light map may be showcased displayed to all users on a home page or a showcase page, step 368. The users with the top-ranked light maps may be rewarded or acknowledged in other ways, such as by upgraded memberships or inclusion on special collaborative panels and discussions facilitated crowdsourcing web site 120.

Alternate Embodiments

Several other embodiments are contemplated by the inventors. For example, while the target of the LED light has been described as a plant, other targets and applications could be substituted. These include animal husbandry, poultry, aquaculture, algae, and human therapies such as for depression and Seasonal Affective Disorder (SAD). The light map may be used for a non-living target, such as an organic or inorganic chemical solution to study photochemical reactions.

This light system may be used as a research tool to explore and research the light-organism interaction. For example, using this system light studies can be performed to see how bacteria colonies grow under different light conditions and how much more toxins (both good and bad) are generated. Examples of yield results might include a lessening of moodiness for SAD (human), egg production (poultry), or plant characteristics and may be shared through the crowdsourcing web site. Growth for SAD may be considered to be mental growth rather than physical growth.

This system can have programmable light included in an environmental growth chamber where the programmable luminaire becomes integrated into the growth chamber with all the functionality described herein. The host could be part of the growth chamber. While LED's have been described, other lighting technologies could be substituted. Modifications to LEDs and creative marketing efforts may cause newer technologies to have different names, but these are still LED's. The programmable luminaire with the growth chamber may lead to light-organism research breakthroughs. Other variation could be as a white light for indoor human use. The white light wavelength could be adjusted to see how human work productivity can increase. For example is there a key light wavelength that will stimulate concentration at work or creativity.

Programmable luminaire 100 does not need to be connected to host 112 to operate. Once the light map has been downloaded and the operating system in programmable luminaire 100 commanded to begin the grow cycle, the host can be disconnected. Programmable luminaire 100 could simply stop turning on the LEDs at the end of the grow cycle, or could signal the user such as by flashing the LED's rapidly, sounding an alarm, displaying a message on a display, sending a message or email to the host, etc. Once the more desirable wavelengths are known from crowdsourcing web site 120, programmable luminaire 100 could be constructed with fewer wavelengths of LED's to reduce costs. Only wavelengths that are confirmed to have the greatest affect on the targeted species may be used. Light maps for other species within the same genus may be returned from shared light map database 110 when no exact species match occurs.

The host interface could use a variety of protocols and technologies. For example, a cable could be used with USB, firewire, a Memory Stick bus, PCI Express bus, Compact Flash (CF), IDE bus, Serial ATA (SATA) bus, etc. A wireless connection such as WiFi could also be used, or an optical connection, or a power-line communication (PLC) connection. A battery backup could be provided for the real-time clock or other components such as microcontroller unit 40. GUI light-map editor 88 could be a stand-alone application on host 112, or an applet or other kind of program that is downloaded and executed from crowdsourcing web site 120. GUI light-map editor 88 can be a software program distributed with programmable luminaire 100. GUI light-map editor 88 can run on a PC, Smartphone, or in any OS (Windows, Linux, Android, Apple, etc) on a host. The latest version of GUI light-map editor 88 may be downloaded from crowdsourcing web site 120 in addition to light map settings. GUI light-map editor 88 and the light map may be two different software packages. Light maps downloaded from crowdsourcing web site 120 could be in the form of a compressed file and/or encrypted. Host 112 could be separate from programmable luminaire 100 or could be integrated with programmable luminaire 100 or with crowdsourcing web site 120. The host could be a PC, Mac, Smartphone, tablet, with any OS (Windows, Linux, Android, Apple, etc.).

A programmable luminaire 100 with 12 separate arrays of LED's could include UV wavelengths such as 290 nm and 380 nm, and could have a greater selection of visible wavelengths such as 415 nm, 440 nm, 460 nm, 480 nm in the blue region, 615 nm, 630 nm, 660 nm in the red region, and 720 nm, 740 nm, 760 nm in the far-red region. Plants or animals may receive some natural sunlight in addition to supplemental light from programmable luminaire 100. The sum of the virtual day and virtual night do not have to be 24 hours in all cases. Some blue light could be produced at night to simulate a moon light night, which may stimulate some plants.

Other factors such as the amount of watering, temperatures, $CO_2$ content, nutrition levels, humidity, etc. may be stored with the light maps and displayed to users. Ideally, these other factors are controlled so that lighting results are comparable.

More complex embodiments to study the effects of sun fleck could be a pulsing light where some wavelengths of light are dimmed but not other wavelengths, or might pulse the dim LED's rather than turn them off altogether. The number of days in each growth stage can be programmed and may vary. Rather than repeat the same light map for each virtual day in a growth stage, the light map may be scaled during the growth stage, such as by gradually increasing light intensities as each day occurs during the growth stage. Darker days representing rain could also be interspersed during a growth stage.

Figure 1:
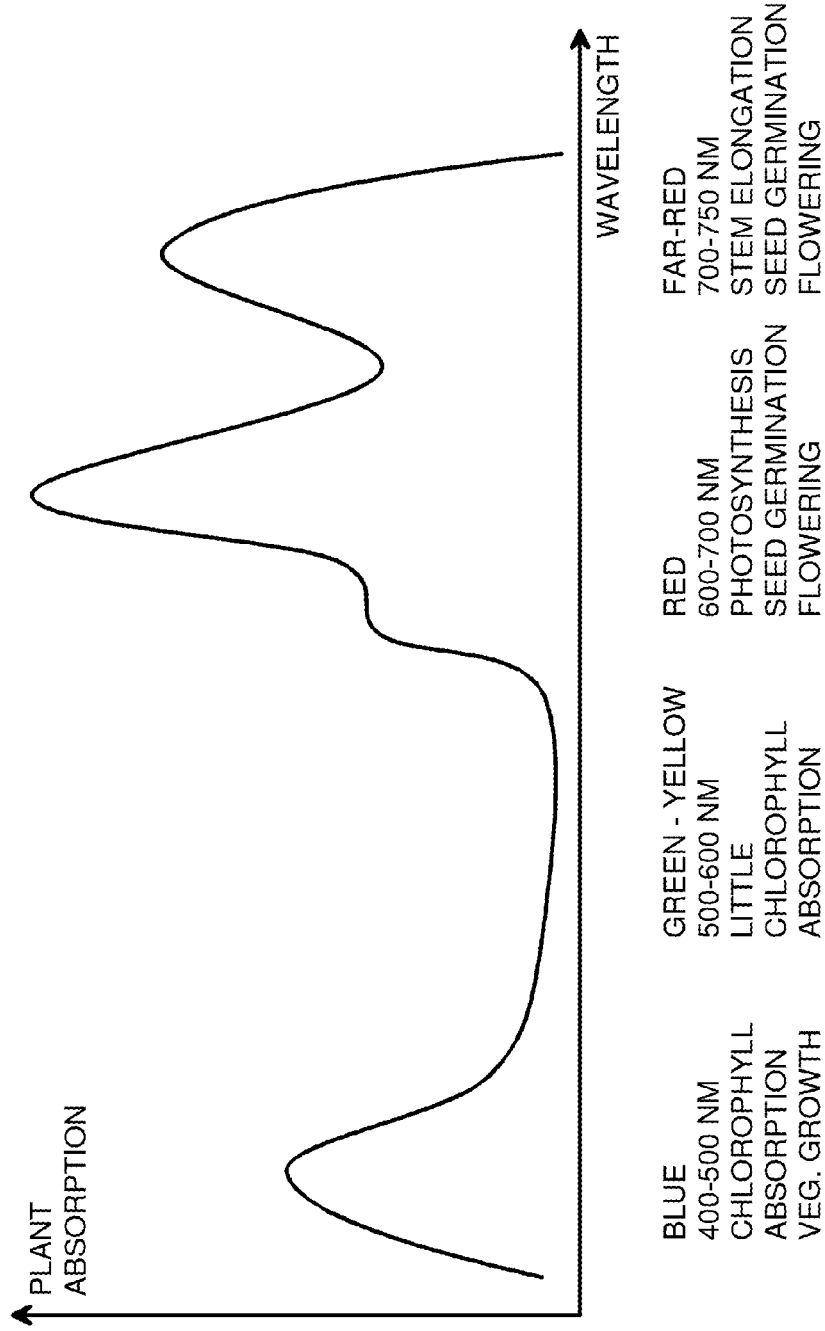
FIG. 1 is a graph of absorption of light by a plant as a function of wavelength.
Figure 2:
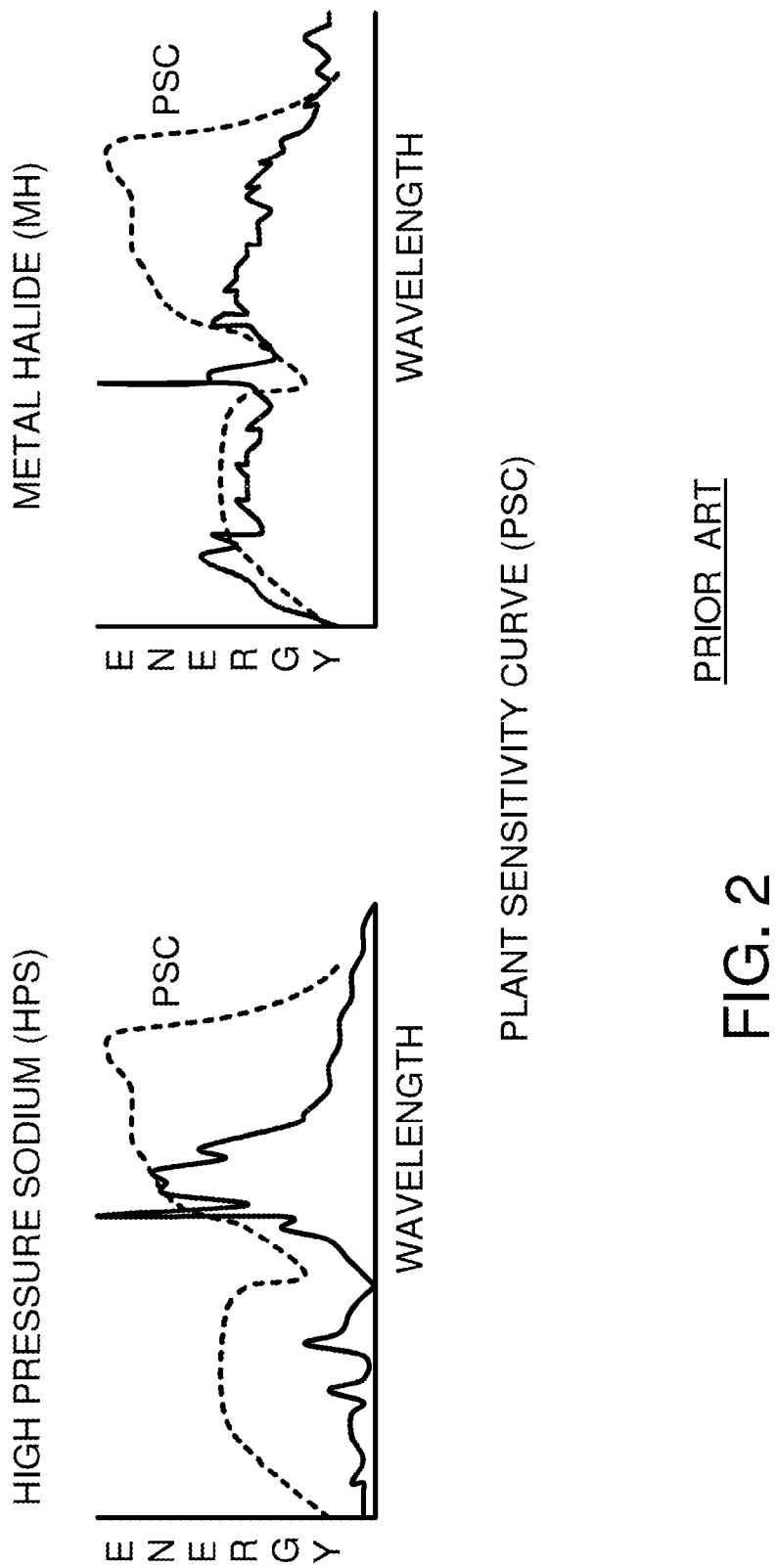
FIG. 2 shows spectra of prior-art lights compared with a plant sensitivity curve.

Some plants may be categorized as short-day plants while other plants may be characterized as long-day plants. Other characterizations may be discovered using programmable luminaire 100 with crowdsourcing web site 120. Some plant behavior such as flowering time may be altered so that flowers open at a pre-defined and controlled time, such as by applying light for a short period of time in the middle of the virtual night. Facilitating a large number of users to collaborate may lead to further discoveries. While FIG. 1 has shown a simple absorption curve for plant-light interaction, a more accurate curve shows photosynthetic photon flux or PPF, measured in micro-moles of photons per meter squared, per second. PPF is the maximum energy available. Only a small proportion of the photons actually are used by chloroplasts, organelles in plant cells that conduct photosynthesis. Animals experience light as luminosity, measured in Lux.

The number of LED's in each array does not have to be the same for all arrays. LED's that emit at a wavelength that is strongly absorbed by the plant may contain more LED's to provide a higher intensity than other less absorbed wavelengths. Some LED's may emit at a lower intensity and may require a larger number of LED's in the array to produce a desired energy output. Different wavelengths may have different photon energy output. For example Blue light has more energy than Red light, according to the formula: photon energy (E)=Planck constant (h)*speed of light (c)/wavelength ($\lambda$). Blue has a shorter wavelength than Red. Since h and c are considered constant, E increases as $\lambda$ decreases. So Blue LEDs output more photon energy than Red.

Host interface 106 can perform other functions, such as receiving commands to initiate a grow cycle or to reset the device or wipe the memory in light map storage 102, or to perform diagnostic routines, such as to test LED's 30-34. While an encrypted light map 114 has been shown as being transferred from host 112 to programmable luminaire 100, non-encrypted light maps may be used.

The light map may be stored in various formats. Intensities of wavelengths may be expressed as a percentage of the maximum (relative) allowed by programmable LED drivers 108, or as a percentage of the maximum allowed by envelope 70 at any point in the day, or may be a current value for programmable LED drivers 108, or some other value that can be converted to a current value and ultimately an intensity of light of a wavelength. These values could be encoded or combined, such as by showing a mixture of the wavelengths at any point in time, such as % red, % blue, % green, etc. Other kinds of encodings are possible. Error correction or validation may be used.

While one light map for each growth stage has been described, and this light map has been described as having many frames (many time/date rows with percentage LED columns) each describing LED settings for a particular time interval during the virtual day, a light map could be considered to contain all settings for the entire grow cycle, or each frame could be considered a light map, so that one grow cycle has many light maps. Microcontroller unit 40 has been described as reading the light map and adjust LED settings every 5 minutes. However, the timer period could be changed to 1 minute, 10, minutes, 30 minutes, 1 hours, or any other period.

GUI light-map editor 88 can have other drawing tools and may have other input fields, such as a length of the virtual day. The wavelength curves can be stretched to fit the specified length of the virtual day. The maximum light intensity at noon could also be specified. The intensity values of individual wavelengths could be adjusted by GUI light-map editor 88 or by a post-processing program so that the sum of the intensities of all wavelengths of light equals the envelope value or the maximum. The noon maximum intensity could be multiplied by a time of day factor that follows the envelope, or approximates a bell curve or other curve that approximates the daylight envelope. Rather than true curves, curves may be approximated using Piece-Wise-Linear (PWL) line segments.

A variety of other functions, services, and tools could be provided by crowdsourcing web site 120, and crowdsourcing web site 120 could link to other web sites to provide some of the tools and features. Not all of the functions and features of crowdsourcing web site 120 described herein need to be provided. The website may also have a revenue structure so that items such as research papers can be bought and sold. Writers of the papers may receive a percentage of sales.

Multiple hosts could be used by the same user. GUI light-map editor 88 could be executed on the same host 112 that downloads the edited light map to programmable luminaire 100, or could execute on a different host and store the edited light map on crowdsourcing web site 120 before downloading by another host to programmable luminaire 100. Some light maps in crowdsourcing web site 120 could be kept private by a user and not accessible by other users. Programmable luminaire 100 could also be able to connect to crowdsourcing web site 120 directly using an Internet connection rather than through a local host.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line or through the air.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A programmable luminaire comprising:
    a microcontroller;
    a light map storage;
    a plurality of arrays of Light-Emitting Diodes (LEDs), each array of LEDs for outputting light at a different wavelength;
    a program memory for storing a lighting program that is executed by the microcontroller to read a light map from the light map storage, and to adjust output-light intensities of the plurality of arrays of LEDs for different wavelengths in response to wavelength specifications in the light map;
    a timer for triggering the microcontroller to apply to the plurality of arrays LEDs a next set of wavelength specifications from the light map after a period of time has elapsed; and
    a host interface that receives an edited light map from a host and writes the edited light map to the light map storage as the light map;
    wherein the light map comprises a first growth-stage daily light map, a second growth-stage daily light map, and a third growth-stage daily light map;
    wherein each growth-stage daily light map specifies at least 5 different wavelengths of output-light intensities that change multiple times over a virtual day;
    wherein the light map further comprises:
    a first-stage day count that specifies a first number of virtual days to repeat the first growth-stage daily light map during a seedling growth stage;
    a second-stage day count that specifies a second number of virtual days to repeat the second growth-stage daily light map during a middle growth stage;
    a third-stage day count that specifies a third number of virtual days to repeat the third growth-stage daily light map during a flowering growth stage,
    whereby edited light maps from the host control output-light intensities for the different wavelengths that are adjusted multiple times during a virtual day, and between multi-day growth stages.

2. The programmable luminaire of claim 1 wherein the plurality of arrays of LED's comprise:
    a first array of LEDs outputting a first wavelength of light that is between 300-500 nm;
    a second array of LEDs outputting a second wavelength of light that is between 500-600 nm; and
    a third array of LEDs outputting a third wavelength of light that is between 600-750 nm.

3. The programmable luminaire of claim 2 wherein the second array of LEDs is driven by the microcontroller to have lower output-light intensities than the first array and the second array, when averaged over a virtual day;
    wherein energy efficiency of the programmable luminaire is increased for plant growth by reducing green and yellow light intensities and increasing red and blue light intensities.

4. The programmable luminaire of claim 1 wherein the light map storage is a non-volatile semiconductor memory.

5. The programmable luminaire of claim 1 further comprising a plurality of channels, each channel for driving one of the plurality of arrays of LED, wherein each channel comprises:
    an adjustable current driver, receiving a wavelength specification from the light map, for adjusting a current to an array of LEDs in response to the wavelength specification from the light map; and
    a constant voltage source, controlled by the microcontroller, for generating a constant voltage to the adjustable current driver.

6. The programmable luminaire of claim 5 further comprising:
    a dimming control circuit, coupled to the microcontroller and to the adjustable current driver in each of the plurality of channels, for reducing light intensities by disabling current from the adjustable current driver for a programmable portion of a repeating period of time.

7. The programmable luminaire of claim 6 wherein the light map further comprises a sun fleck specification that specifies dimming of wavelengths of light for a shading period of time during a virtual day,
    whereby sun fleck shading is specified by the light map.

8. A programmable-lighting optimization system comprising:
    a programmable luminaire which comprises:
    a first array of Light-Emitting Diodes (LEDs) that emit light at a first wavelength;
    a second array of Light-Emitting Diodes (LEDs) that emit light at a second wavelength;
    a third array of Light-Emitting Diodes (LEDs) that emit light at a third wavelength;
    a fourth array of Light-Emitting Diodes (LEDs) that emit light at a fourth wavelength;
    a fifth array of Light-Emitting Diodes (LEDs) that emit light at a fifth wavelength;
    wherein the first, second, third, fourth, and fifth wavelengths are different wavelengths of light;

a light map storage that stores a light map having wavelength-intensity specifications for the first, second, third, fourth, and fifth wavelengths that vary over time;

programmable LED drivers that vary light intensities of arrays of LEDs in response to the wavelength-intensity specifications from the light map;

a timer for triggering a new set of wavelength-intensity specifications from the light map to be applied to the programmable LED drivers after a period of time;

a crowdsourcing web site accessed by users;

a shared light map database, accessed through the crowdsourcing web site, for storing light maps;

a light-map editor, executed by users to modify a light map to generate an edited light map;

a host interface that copies the edited light map to the light map storage in the programmable luminaire;

a review module, on the crowdsourcing web site, that queries users to submit votes for light maps;

a ranking module, on the crowdsourcing web site, for using the votes to generate a rank score for a light map; and a display module that displays matching light maps from the shared light map database that match a user query, and for displaying the matching light maps in a ranked order based on the rank score from the ranking module;

whereby light maps used by the programmable luminaire are edited and ranked by the crowdsourcing web site.

9. The programmable-lighting optimization system of claim 8 wherein the shared light map database comprises light maps for use on a specific living organism;

wherein the shared light map database is searchable by a kind of living organism.

10. The programmable-lighting optimization system of claim 8 wherein the light map specifies wavelength-intensity specifications that adjust light intensities of different wavelengths multiple times during a virtual day, and that specifies multiple stages of the wavelength-intensity specifications, wherein each of the multiple stages is a multi-day growth stage, whereby light intensities are adjusted during a day and after each multi-day growth stage.

11. The programmable-lighting optimization system of claim 10 wherein the light-map editor is a graphical-user-interface (GUI) that comprises:

a draw pad window that displays and modifies a user-drawn curve that graphically shows wavelength-intensity specifications from the light map for a selected wavelength for one virtual day;

a wavelength selector that selects as the selected wavelength edited in the draw pad window from a plurality of wavelengths that includes the first, second, third, fourth, and fifth wavelengths;

a combined wavelength display window that shows a graph of multiple wavelengths superimposed on each other for the virtual day; and a growth-stage selector that allows a user to specify a current multi-day growth stage that is being displayed and edited.

12. The programmable-lighting optimization system of claim 11 wherein the light-map editor further comprises:

a plurality of single-wavelength windows, each for displaying a curve for a single wavelength over the virtual day.

13. The programmable-lighting optimization system of claim 8 wherein the ranking module generates the rank score for a current light map based rank scores of linked light maps that are linked to the current light map;

wherein a linked light map is linked to the current light map when a same user generated both light maps, or when the current light map is derived from the linked light map.

14. The programmable-lighting optimization system of claim 8 wherein the light map further specifies a shading period when the light intensities are dimmed to test shading during a virtual day.

15. A method for optimizing lighting applied to a living organism comprising:

searching a shared light map database for light maps for the living organism and identifying matching light maps;

ranking the matching light maps based on ranking criteria that include votes from users of a crowdsourcing web site and reported results from prior usage of the matching light map;

displaying a ranked list on an electronic display device to a user, the ranked list identifying the matching light maps in an order determined by the ranking;

when no matching light map is found by the searching, displaying a default light map for a different living organism to the user;

receiving a selection from the user, the selection identifying the default light map or one of the matching light maps as the selected light map;

using a light-map editor to edit the selected light map to generate an edited light map with edits of wavelengths from the user;

sending the edited light map to a programmable luminaire;

using the edited light map to control time, intensity, and mixture of a plurality of wavelengths of light applied by the programmable luminaire to the living organism during a grow cycle of multiple virtual days;

during multiple times in a virtual day, the programmable luminaire adjusting intensities of the wavelengths of light in response to the edited light map;

when the grow cycle is completed, the user evaluating the living organism to generate yield results;

uploading the edited light map and the yield results to the shared light map database;

displaying the yield results and the edited light map to other users of the crowdsourcing web site and receiving votes from the other users for the edited light map; and ranking the edited light map using the votes and displaying the edited light map in a ranked order to other users of the crowdsourcing web site;

whereby the edited light map is voted on by other users of the crowdsourcing web site for ranking.

16. The method for optimizing lighting applied to a living organism of claim 15 wherein receiving votes comprises receiving expert votes from expert users of the crowdsourcing web site, the expert users including experts from academic institutions, and receiving hobbyist votes from hobbyist users of the crowdsourcing web site;

wherein ranking the edited light map further comprises weighting the expert votes more highly than the hobbyist votes, whereby expert and hobbyist votes are received and weighted for ranking.

17. The method for optimizing lighting applied to a living organism of claim 15 wherein the programmable luminaire adjusting intensities of the wavelengths of light in response to the edited light map comprises adjusting at least 5 different wavelengths of light by adjusting current to at least 5 arrays of Light-Emitting Diodes (LEDs) each producing a different wavelength of light.

18. The method for optimizing lighting applied to a living organism of claim 17 further comprising:

during a sun fleck period of the virtual day, dimming some of the wavelengths of light to test shading on the living organism, whereby sun fleck is tested on the living organism by dimming followed by a burst of light energy.

19. The method for optimizing lighting applied to a living organism of claim 18 further comprising:

during the grow cycle, comparing a grow time since a start of the grow cycle to a current time to detect a setting time between growth stages;

when the setting time is detected, switching to read a different portion of the edited light map, the different portion for a next growth stage, wherein time, intensity, and mixture of the plurality of wavelengths of light applied by the programmable luminaire to the living organism are adjusted during the grow cycle of multiple growth stages, wherein each growth stage comprises multiple virtual days, whereby wavelengths are adjusted for different growth stages and within each virtual day.

20. The method for optimizing lighting applied to a living organism of claim 18 wherein searching the shared light map database for light maps for the living organism comprises searching by a species of living organism within a genus of a kind of a living organism, and returning a light map for another species of living organism within a same genus of living organisms.

\* \* \* \* \*